(12) United States Patent
Henry et al.

(10) Patent No.: US 12,306,007 B2
(45) Date of Patent: May 20, 2025

(54) SYSTEM AND METHOD FOR CHART THUMBNAIL IMAGE GENERATION

(71) Applicant: Rockwell Collins, Inc., Cedar Rapids, IA (US)

(72) Inventors: Jeff M. Henry, Cedar Rapids, IA (US); Kyle R. Peters, Ely, IA (US); Srinath A. Nandakumar, San Ramon, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 428 days.

(21) Appl. No.: 17/559,823

(22) Filed: Dec. 22, 2021

(65) Prior Publication Data

US 2023/0152116 A1 May 18, 2023

Related U.S. Application Data

(60) Provisional application No. 63/278,576, filed on Nov. 12, 2021.

(51) Int. Cl.
*G01C 21/00* (2006.01)
*G01C 21/36* (2006.01)
(Continued)

(52) U.S. Cl.
CPC ........ *G01C 21/367* (2013.01); *G01C 21/3811* (2020.08); *G01C 21/387* (2020.08); *G06F 3/0481* (2013.01); *G06F 3/04817* (2013.01)

(58) Field of Classification Search
CPC ..... G06T 2200/24; G06F 16/54; G06F 3/048; G06F 3/0482; G06F 3/0485;
(Continued)

(56) References Cited

U.S. PATENT DOCUMENTS 3,522,586 A 8/1970 Kiji et al.
3,656,178 A 4/1972 Maine et al.
(Continued)

FOREIGN PATENT DOCUMENTS

CA 3095088 C 2/2021
CN 1045835 C 10/1999
(Continued)

OTHER PUBLICATIONS

Extended European Search Report dated Apr. 21, 2023; European Application No. 22207060.9.
(Continued)

*Primary Examiner* — Steven B Theriault
(74) *Attorney, Agent, or Firm* — Suiter Swantz IP

(57) ABSTRACT

A method for generating thumbnails is disclosed. The method may include receiving an area map, and chart data having a geographical information set. The method may include generating a plurality of panels having one or more panel corners based on the chart data. The method may include projecting the one or more panel corners onto the area map, defining one or more corners of a plurality of areas to be extracted. The method may include determining an extraction mapping for each area to be extracted, the extraction mapping configured to map the plurality of areas to be extracted to a plurality of thumbnail panels. The method may include extracting area map data from each area to be extracted to generate a plurality of thumbnail panels using the determined extraction mapping. The method may include generating a thumbnail display by combining each thumbnail panel of the plurality of thumbnail panels.

15 Claims, 11 Drawing Sheets

(51) Int. Cl.
*G06F 3/0481* (2022.01)
*G06F 3/04817* (2022.01)

(58) Field of Classification Search
CPC .... G06F 16/156; G06F 16/29; G06F 3/04817; G06F 16/487; G06F 16/9537; G06F 16/444; G06F 3/04842
See application file for complete search history.

(56) References Cited

U.S. PATENT DOCUMENTS

| | | | |
|---|---|---|---|
| 4,096,527 A | | 6/1978 | Furuta |
| 4,736,303 A | | 4/1988 | Itoh et al. |
| 4,792,981 A | | 12/1988 | Cahill, III et al. |
| 4,876,651 A | | 10/1989 | Dawson et al. |
| 5,050,230 A | | 9/1991 | Jones et al. |
| 5,428,692 A | | 6/1995 | Kuehl |
| 5,454,076 A | | 9/1995 | Cain et al. |
| 5,499,382 A | | 3/1996 | Nusinov et al. |
| 5,537,669 A | | 7/1996 | Evans et al. |
| 5,546,572 A | | 8/1996 | Seto et al. |
| 5,559,707 A | | 9/1996 | DeLorme et al. |
| 5,577,170 A | | 11/1996 | Karow |
| 5,917,436 A | | 6/1999 | Endo et al. |
| 5,936,637 A | | 8/1999 | Seto |
| 5,978,715 A | | 11/1999 | Briffe et al. |
| 6,014,133 A | | 1/2000 | Yamakado et al. |
| 6,240,341 B1 | | 5/2001 | Snyder |
| 6,275,610 B1 | | 8/2001 | Hall, Jr. et al. |
| 6,320,984 B1 | | 11/2001 | Shigeta |
| 6,336,074 B1 | | 1/2002 | Woo |
| 6,448,922 B1 | | 9/2002 | Kelly |
| 6,501,441 B1 | | 12/2002 | Ludtke et al. |
| 6,757,445 B1* | | 6/2004 | Knopp ............... G01C 11/06 382/296 |
| 6,839,714 B2 | | 1/2005 | Wheeler et al. |
| 6,922,703 B1 | | 7/2005 | Snyder et al. |
| 7,039,505 B1 | | 5/2006 | Southard et al. |
| 7,096,211 B2 | | 8/2006 | Fujihara |
| 7,173,738 B2 | | 2/2007 | Kohn |
| 7,552,010 B2 | | 6/2009 | Saito |
| 7,552,011 B2 | | 6/2009 | Ishii et al. |
| 7,562,289 B2 | | 7/2009 | Bufkin et al. |
| 7,581,036 B2 | | 8/2009 | Powell et al. |
| 7,609,263 B2 | | 10/2009 | Nagasaki et al. |
| 7,739,622 B2 | | 6/2010 | DeLine et al. |
| 7,777,749 B2 | | 8/2010 | Chung et al. |
| 7,948,502 B2* | | 5/2011 | Stanton ............. G09B 29/007 345/660 |
| 7,966,609 B2 | | 6/2011 | Serebryany |
| 8,035,642 B2 | | 10/2011 | Suzuki |
| 8,134,362 B1 | | 3/2012 | Hullender et al. |
| 8,165,732 B2 | | 4/2012 | Corbefin et al. |
| 8,169,505 B2 | | 5/2012 | Hoshi |
| 8,306,745 B1 | | 11/2012 | Clark et al. |
| 8,339,417 B2 | | 12/2012 | Stroila et al. |
| 8,374,390 B2 | | 2/2013 | Stroila et al. |
| 8,379,065 B2 | | 2/2013 | Nam et al. |
| 8,453,060 B2* | | 5/2013 | Ofek ..................... G06F 16/29 715/757 |
| 8,515,658 B1 | | 8/2013 | Foster et al. |
| 8,583,368 B1 | | 11/2013 | Sindlinger et al. |
| 8,704,732 B2 | | 4/2014 | Pourbigharaz et al. |
| 8,799,799 B1* | | 8/2014 | Cervelli .............. G06T 11/60 707/723 |
| 8,878,872 B1 | | 11/2014 | Raghu et al. |
| 8,937,737 B2 | | 1/2015 | Tsutsumi et al. |
| 9,035,969 B2 | | 5/2015 | Ivashin et al. |
| 9,111,397 B2 | | 8/2015 | Kalai et al. |
| 9,195,637 B2 | | 11/2015 | Peraza et al. |
| 9,247,133 B2* | | 1/2016 | Doepke ................ G06T 7/35 |
| 9,430,195 B1 | | 8/2016 | Pecoraro et al. |
| 9,443,433 B1 | | 9/2016 | Conway et al. |
| 9,465,513 B2 | | 10/2016 | Sims |
| 9,489,121 B2 | | 11/2016 | Davis et al. |
| 9,547,727 B2 | | 1/2017 | Passani et al. |
| 9,619,919 B1 | | 4/2017 | Postnikov et al. |
| 9,635,313 B2* | | 4/2017 | Hasegawa .......... G06F 3/04845 |
| 9,639,309 B1 | | 5/2017 | Pugh |
| 9,671,935 B2 | | 6/2017 | Miichi et al. |
| 9,682,784 B2 | | 6/2017 | Wiebers |
| 9,703,455 B2 | | 7/2017 | Cocco et al. |
| 9,781,294 B1 | | 10/2017 | Chapman |
| 9,818,051 B2* | | 11/2017 | Panek ................ G06K 15/1842 |
| 9,858,823 B1 | | 1/2018 | Lynn et al. |
| 9,891,875 B2 | | 2/2018 | Kim et al. |
| 9,921,721 B2 | | 3/2018 | Beavers et al. |
| 9,939,271 B1 | | 4/2018 | Foster et al. |
| 10,001,376 B1 | | 6/2018 | Tiana et al. |
| 10,061,480 B1 | | 8/2018 | McCusker et al. |
| 10,170,010 B1 | | 1/2019 | McCusker et al. |
| 10,277,869 B2* | | 4/2019 | Kim .................... H04N 23/661 |
| 10,297,159 B2 | | 5/2019 | Srivastav et al. |
| 10,372,292 B2 | | 8/2019 | Vogel et al. |
| 10,579,187 B2* | | 3/2020 | Takahashi .......... G06F 3/04817 |
| 10,598,780 B2* | | 3/2020 | Bellett ................ G01S 7/295 |
| 10,664,510 B1* | | 5/2020 | Hochmuth .............. G09G 5/14 |
| 10,674,075 B2 | | 6/2020 | Kimura |
| 10,684,769 B2 | | 6/2020 | Yamat et al. |
| 10,872,274 B2 | | 12/2020 | Mao et al. |
| 10,880,522 B2 | | 12/2020 | McCutchen et al. |
| 10,984,501 B2 | | 4/2021 | Milan et al. |
| 11,030,477 B2 | | 6/2021 | Becker et al. |
| 11,061,563 B1 | | 7/2021 | Nielsen et al. |
| 11,106,329 B2 | | 8/2021 | He et al. |
| 11,334,543 B1 | | 5/2022 | Anwar et al. |
| 11,885,623 B1 | | 1/2024 | Goldstein |
| 2001/0015759 A1* | | 8/2001 | Squibbs ............. H04N 1/00172 707/E17.026 |
| 2003/0151630 A1 | | 8/2003 | Kellman et al. |
| 2004/0056883 A1* | | 3/2004 | Wierowski .......... G06T 15/205 |
| 2004/0071351 A1 | | 4/2004 | Rade |
| 2004/0225440 A1 | | 11/2004 | Khatwa et al. |
| 2004/0225635 A1* | | 11/2004 | Toyama ................ G06F 16/54 |
| 2005/0010359 A1 | | 1/2005 | Qureshi |
| 2005/0030321 A1 | | 2/2005 | Anwar |
| 2005/0091340 A1 | | 4/2005 | Facemire et al. |
| 2005/0264577 A1* | | 12/2005 | Blais ..................... G06T 15/04 345/582 |
| 2006/0031006 A1 | | 2/2006 | Stenbock et al. |
| 2006/0167629 A1* | | 7/2006 | Ishii ................. G01C 21/3896 701/455 |
| 2006/0215915 A1 | | 9/2006 | Kim |
| 2007/0067095 A1 | | 3/2007 | King |
| 2007/0094591 A1 | | 4/2007 | Etgen et al. |
| 2007/0112517 A1 | | 5/2007 | Goldstein |
| 2007/0132767 A1* | | 6/2007 | Wright ................... G06V 20/52 345/475 |
| 2007/0185651 A1 | | 8/2007 | Motoyama et al. |
| 2007/0211151 A1* | | 9/2007 | Baiping ................. G06F 16/50 348/231.2 |
| 2007/0268313 A1* | | 11/2007 | Dolph ................ G06F 3/04817 345/635 |
| 2008/0045138 A1* | | 2/2008 | Milic-Frayling .. H04N 1/00307 455/3.04 |
| 2008/0046254 A1 | | 2/2008 | Nuno et al. |
| 2008/0103641 A1 | | 5/2008 | Ratcliffe |
| 2008/0125960 A1 | | 5/2008 | Wipplinger et al. |
| 2008/0172627 A1* | | 7/2008 | Hagawa ................ G06F 3/0485 715/765 |
| 2008/0192053 A1* | | 8/2008 | Howell .................... G06T 7/30 382/295 |
| 2008/0240152 A1 | | 10/2008 | Quinn et al. |
| 2009/0080801 A1 | | 3/2009 | Hatfield et al. |
| 2009/0089660 A1* | | 4/2009 | Atkins ................ G06F 40/106 715/243 |
| 2009/0123070 A1 | | 5/2009 | Xiaoying |
| 2009/0125837 A1 | | 5/2009 | Hatem et al. |
| 2009/0172035 A1 | | 7/2009 | Lessing et al. |
| 2009/0210388 A1* | | 8/2009 | Elson ..................... G06F 16/29 |
| 2009/0324065 A1 | | 12/2009 | Ishida et al. |
| 2010/0128020 A1 | | 5/2010 | Oh et al. |

(56) References Cited

U.S. PATENT DOCUMENTS

| | | | |
|---|---|---|---|
| 2010/0185984 A1* | 7/2010 | Wright | G06F 16/29 715/833 |
| 2010/0194783 A1 | 8/2010 | Kanamaru et al. | |
| 2010/0218089 A1 | 8/2010 | Chao et al. | |
| 2010/0262318 A1 | 10/2010 | Ariens | |
| 2010/0328353 A1 | 12/2010 | McDonald et al. | |
| 2011/0043539 A1 | 2/2011 | Hiroki | |
| 2011/0122153 A1* | 5/2011 | Okamura | G09B 29/106 345/629 |
| 2011/0187741 A1* | 8/2011 | Akiya | G09B 29/10 345/625 |
| 2011/0191014 A1 | 8/2011 | Feng et al. | |
| 2012/0010765 A1 | 1/2012 | Wilson et al. | |
| 2012/0019673 A1* | 1/2012 | Narayanan | G06F 16/29 348/207.1 |
| 2012/0113475 A1* | 5/2012 | Sugiyama | G06T 11/60 358/1.18 |
| 2012/0123680 A1 | 5/2012 | Wipplinger et al. | |
| 2012/0233542 A1* | 9/2012 | Funakoshi | H01L 22/12 715/243 |
| 2012/0242687 A1 | 9/2012 | Choi | |
| 2012/0287151 A1 | 11/2012 | James et al. | |
| 2013/0009891 A1* | 1/2013 | Watanabe | H04N 13/398 345/173 |
| 2013/0159825 A1* | 6/2013 | Nishio | G06F 16/29 707/706 |
| 2013/0204880 A1 | 8/2013 | Lesiecki et al. | |
| 2014/0104246 A1 | 4/2014 | Rao et al. | |
| 2014/0109012 A1* | 4/2014 | Choudhary | G06F 3/04817 715/838 |
| 2014/0168277 A1 | 6/2014 | Ashley et al. | |
| 2014/0225928 A1 | 8/2014 | Konnola et al. | |
| 2014/0229861 A1* | 8/2014 | Hellstrom | H04M 1/00 715/753 |
| 2014/0247268 A1* | 9/2014 | Drucker | G06T 13/80 345/440.2 |
| 2014/0282038 A1 | 9/2014 | Royster et al. | |
| 2014/0310655 A1* | 10/2014 | Sims | G06F 3/04817 715/838 |
| 2014/0337816 A1 | 11/2014 | Chiluvuri | |
| 2015/0070356 A1* | 3/2015 | Da Veiga | G06F 16/29 345/427 |
| 2015/0070373 A1 | 3/2015 | Clinton | |
| 2015/0139524 A1* | 5/2015 | Choi | G06T 5/70 382/132 |
| 2015/0193648 A1* | 7/2015 | Hasegawa | G06T 11/60 382/128 |
| 2015/0227405 A1 | 8/2015 | Jan et al. | |
| 2015/0239574 A1 | 8/2015 | Ball et al. | |
| 2015/0278626 A1 | 10/2015 | Nakamura | |
| 2015/0324088 A1 | 11/2015 | Pasetto et al. | |
| 2015/0352952 A1 | 12/2015 | Kneuper et al. | |
| 2016/0092557 A1 | 3/2016 | Stojanovic et al. | |
| 2016/0293017 A1 | 10/2016 | Whelan | |
| 2016/0299905 A1* | 10/2016 | Geyer | G06F 16/248 |
| 2017/0011064 A1* | 1/2017 | Mercer | G06F 16/29 |
| 2017/0046962 A1 | 2/2017 | Shipley et al. | |
| 2017/0124734 A1 | 5/2017 | Gowda | |
| 2017/0241798 A1 | 8/2017 | Van Den Bergh et al. | |
| 2017/0262413 A1 | 9/2017 | Song et al. | |
| 2017/0287170 A1* | 10/2017 | Perona | G06V 20/56 |
| 2017/0299633 A1 | 10/2017 | Pietrowicz et al. | |
| 2017/0301117 A1* | 10/2017 | Lanza | G06F 16/54 |
| 2017/0301118 A1* | 10/2017 | Lanza | G06F 3/04845 |
| 2017/0313332 A1 | 11/2017 | Paget et al. | |
| 2018/0007137 A1 | 1/2018 | Watson et al. | |
| 2018/0025059 A1 | 1/2018 | Batchu et al. | |
| 2018/0174588 A1 | 6/2018 | Agarwal et al. | |
| 2018/0181646 A1 | 6/2018 | Balasa et al. | |
| 2018/0253889 A1 | 9/2018 | Nagasaka | |
| 2018/0262884 A1 | 9/2018 | Hosier, Jr. | |
| 2018/0301111 A1* | 10/2018 | Park | G09B 29/00 |
| 2018/0329927 A1* | 11/2018 | Garg | G06T 3/04 |
| 2019/0057671 A1 | 2/2019 | Baer et al. | |
| 2019/0220234 A1 | 7/2019 | Lewis et al. | |
| 2019/0237043 A1 | 8/2019 | Tahmasebi | |
| 2019/0272618 A1* | 9/2019 | Boyce | H04N 23/698 |
| 2019/0299701 A1 | 10/2019 | Bartels | |
| 2020/0013491 A1 | 1/2020 | Carter et al. | |
| 2020/0050586 A1 | 2/2020 | Pal et al. | |
| 2020/0066017 A1* | 2/2020 | Kawachi | G06F 16/487 |
| 2020/0089694 A1 | 3/2020 | Cabra et al. | |
| 2020/0097283 A1 | 3/2020 | Coccia | |
| 2020/0192872 A1 | 6/2020 | Quinn | |
| 2020/0195924 A1 | 6/2020 | Hsiang | |
| 2020/0251029 A1* | 8/2020 | Tseng | G09G 3/005 |
| 2020/0252594 A1* | 8/2020 | Lee | H04N 13/398 |
| 2020/0255350 A1 | 8/2020 | Baek | |
| 2020/0320142 A1 | 10/2020 | Malak et al. | |
| 2020/0320884 A1 | 10/2020 | Hillier et al. | |
| 2020/0386567 A1 | 12/2020 | Igarashi | |
| 2020/0401263 A1 | 12/2020 | Chung et al. | |
| 2021/0004930 A1 | 1/2021 | Kamath et al. | |
| 2021/0035453 A1 | 2/2021 | Khan et al. | |
| 2021/0056300 A1 | 2/2021 | Chitta et al. | |
| 2021/0150088 A1 | 5/2021 | Gallo et al. | |
| 2021/0184758 A1 | 6/2021 | Barritt et al. | |
| 2021/0192202 A1 | 6/2021 | Tripuraneni et al. | |
| 2021/0206459 A1 | 7/2021 | Johnson et al. | |
| 2021/0208779 A1 | 7/2021 | Nielsen et al. | |
| 2021/0225181 A1 | 7/2021 | Feyereisen et al. | |
| 2021/0312351 A1 | 10/2021 | Pourmohammad et al. | |
| 2021/0349615 A1 | 11/2021 | Ruby et al. | |
| 2022/0018972 A1 | 1/2022 | Bennington et al. | |
| 2022/0082404 A1 | 3/2022 | Barre et al. | |
| 2022/0139238 A1 | 5/2022 | Teague | |
| 2022/0197961 A1 | 6/2022 | Baek et al. | |
| 2023/0150685 A1* | 5/2023 | Peters | G01C 21/3881 701/3 |
| 2023/0150686 A1* | 5/2023 | Henry | G06F 3/1423 701/3 |
| 2023/0154338 A1 | 5/2023 | Henry et al. | |
| 2023/0154341 A1* | 5/2023 | Peters | G08G 5/0021 701/3 |
| 2023/0169625 A1* | 6/2023 | Kumar | G06T 7/70 382/284 |

FOREIGN PATENT DOCUMENTS

| | | |
|---|---|---|
| CN | 100440222 C | 12/2008 |
| CN | 101751449 A | 6/2010 |
| CN | 101676988 B | 12/2011 |
| CN | 102714759 B | 10/2016 |
| CN | 107026958 A | 8/2017 |
| CN | 107402734 A | 11/2017 |
| CN | 109325083 A | 2/2019 |
| CN | 110727747 A | 1/2020 |
| CN | 110906938 A | 3/2020 |
| EP | 0341645 A2 | 11/1989 |
| EP | 0380294 A1 | 8/1990 |
| EP | 0748562 A1 | 10/1998 |
| EP | 1352315 A2 | 10/2003 |
| EP | 1366462 A2 | 12/2003 |
| EP | 1454213 A2 | 9/2004 |
| EP | 1272977 B1 | 12/2004 |
| EP | 1687777 A2 | 8/2006 |
| EP | 2224359 A2 | 9/2010 |
| EP | 2792998 A2 | 10/2014 |
| EP | 2879061 A2 | 6/2015 |
| EP | 1736894 A4 | 7/2016 |
| EP | 3201879 A1 | 8/2017 |
| EP | 3538978 A4 | 8/2020 |
| EP | 3845862 A1 | 7/2021 |
| GB | 2504085 A | 1/2014 |
| JP | S622721 A | 1/1987 |
| JP | S62196772 A | 8/1987 |
| JP | S6393273 A | 4/1988 |
| JP | H05205069 A | 8/1993 |
| JP | 3871040 B2 | 1/2007 |
| JP | 2007133231 A | 5/2007 |
| JP | 2008022215 A | 1/2008 |
| JP | 2009282855 A | 12/2009 |

(56) References Cited

FOREIGN PATENT DOCUMENTS

| JP | 4728744 B2 | 7/2011 |
|---|---|---|
| WO | 9523364 A2 | 8/1995 |
| WO | 1998043208 A3 | 1/1999 |
| WO | 2011036499 A1 | 3/2011 |
| WO | 2014146561 A1 | 9/2014 |
| WO | 2021035223 A1 | 2/2021 |
| WO | 2021035954 A1 | 3/2021 |

OTHER PUBLICATIONS

Extended European Search Report dated Jun. 13, 2023; European Application No. 22206954.4.
Neupane Prasanga et al: "Extracting Unknown Repeated Pattern in Tiled Images: 19th International Conference on Hybrid Intelligent Systems (HIS 2019) held in Bhopal, India, Dec. 10-12, 2019" In: Intelligent Autonomous Systems 13, International Publishing, Cham, vol. 1179, pp. 92-102.
Yang Y. et al: "Vectorization of Linear Features in Scanned Topographic Maps Using Adaptive Image Segmentation and Sequential Line Tracking", The International Archives of the Photogrammetry, Remote Sensing and Spatial Information Sciences, vol. XXXIX-B4, Aug. 25, 2012, pp. 103-108.
Extended European Search Report dated Apr. 11, 2023; European Application No. 22207049.2.
Extended European Search Report dated Apr. 4, 2023; European Application No. 22207012.0.
Extended European Search Report dated Apr. 5, 2023; European Application No. 22207019.5.
Hatlapatka Radim: "JBIG2 Supported by OCR", EUDML Jul. 9, 2012, pp. 1-9.
Shang Junqing et al: "JBIG2 text image compression based on OCR", Proceedings of the SPIE, vol. 6067, Jan. 15, 2006, p. 6067D.
Anonymous: "Pilot's Guide to ForeFlight Mobile 82nd Edition Covers ForeFlight Mobile v12.7", Aug. 26, 2020, pp. 161-165.
Anonymous: Pilot's Guide to ForeFlight Mobile 82nd Edition Covers ForeFlight Mobile v12.7, Aug. 26, 2020, pp. 78-90.
Extended European Search Report dated Apr. 5, 2023, European Application No. 22207025.2.
Extended European Search Report dated Apr. 5, 2023; European Application No. 22207047.6.
Extended European Search Report dated Apr. 5, 2023; European Application No. 22207057.5.
Anonymous: "SkyDemon Mobile, GBS handheld navigation devices for aircrfaft", Dec. 4, 2021; Internet URL https://web.archive.org/web/20211204140934/https://www.skydemon.aero/inflight/.
C. Pschierer et al, "Human factors analysis for a 2D enroute moving map application", SPIE, PO Box 10, Bellingham, WA 98227-0010 USA, vol. 5802, May 25, 2005.
Extended European Search Report dated Apr. 11, 2023; European Application No. 22207123.5.
Extended European Search Report dated Apr. 12, 2023; European Application No. 22207050.0.
Extended European Search Report dated Apr. 12, 2023; European Application No. 22207124.3.
Extended European Search Report dated Apr. 18, 2023; European Application No. 22207164.9.
Rockwell Collins: "Flight Database Services for Pro Line Fusion", Jan. 12, 2021, XP093035870, Internet URL: https://www.rockwellcollins.com/-/media/files/unsecure/products/product-brochures/navigation-and-guidance/flight-management-systems/resources/fusion-data-base-services-01.pdf?la=en&lastupdate=20210125195039&csrt=15271691716207860418, p. 5.
Skysectionals: "Tour Low-Altitute Enroute Charts", Sep. 22, 2021; XP093035866, Internet: URL:https://web.archive.org/web/20210922184910/https://skysectionals.com/tour-enroute/.
Stephen Dubet; Institute of Electrical and Electronics Engineers: "Aeronautical charts for electronic flight bags", 22nd. DASC. The 22nd Digital Avionics Systems Conference Proceedings. Indianapolis, IN Oct. 12-16, 2003. vol. 2, pp. 13_D_1_1_13_D_1_9, XP010669024.
Extended European Search Report dated Mar. 24, 2023; European Application No. 22207029.4.
Anonymous: "algorithm-Contour of a run-length-coded digital shape", Stack Overflow, Dec. 31, 2015, pp. 1-5, URL:https://stackoverflow.com/questions/32354807/contour-of-a-run-length-coded-digital-shape.
Seo et al., "Fast Contour-Tracing Algorithm Based on a Pixel-Following Method for Image Sensors", Sensors, MPDI (Year: 2016).
U.S. Appl. No. 17/525,184, filed Nov. 12, 2021, Henry.
U.S. Appl. No. 17/525,130, filed Nov. 12, 2021, Peters et al.
ArcGIS, "Introduction to export a map or layout", retrieved from the Internet Nov. 11, 2021.
Bongwon Suh, Haibin Ling, Benjamin B. Bederson, and David W. Jacobs. 2003. Automatic thumbnail cropping and its effectiveness. In Proceedings of the 16th annual ACM symposium on User interface software and technology (UIST 03). Association for Computing Machinery, New York, NY, USA, 95-104.
Houston, Ben & Nielsen, Michael & Batty, Christopher & Nilsson, Ola & Museth, Ken. (2006). Hierarchical RLE Level Set: A compact and versatile deformable surface representation. ACM Trans. Graph.. 25. 151-175.
Jeppesen, "JeppView for Windows, User Guide", (2016), 92 pages.
Lufthanasa Systems Blog, "Lido eRouteManual 4.3 Design Overview", (2016) Retrieved from the Internet.
Maptiler, "Software performs Geocoding, Place name search, and Reverse Geocoding." Retrieved from Internet on Nov. 11, 2021.
Microsoft, "Generate a thumbnail sprite with Azure Media Services", (2021), Retrieved from Internet Nov. 11, 2021.
Narkive Mailinglist Archive, "Fastest Method of Drawing a TileMap", (2002), Retrieved from Internet Nov. 11, 2021.
Navigraph, "Navigraph Charts", Retrieved from the Internet.
Pamental, Jason, "Digging in to dynamic typography", Retrieved from Internet , Nov. 11, 2021, 11 pages.
Pamental, Jason, "The evolution of typography with variable fonts", Retrieved from the Internet , Nov. 11, 2021.
Penquerch, "[AD] RLE clipping speedup patch" (2002), Retrieved from Internet , Nov. 11, 2021.
QGIS: Open-source cross-platform GIS software, Retrieved from Internet , Nov. 11, 2021.
Somasundaram, K. "A Method for Filling Holes in Objects of Medical Images Using Region Labeling and Run Length Encoding Schemes." (2010).
Schouten, Tjeerd, Real time EFIS vector graphics, Bit Barrel Media, available at https://bitbarrelmedia.wordpress.com/2017/11/01/real-time-efis-vector-graphics/ (Nov. 11, 2017).
IDR Solutions, "How to Convert PDF to SVG in 1 minute," http://www.youtube.com/watch?v=VoyjqGIrHGk, Mar. 1, 20217.
IFR Enroute Aeronautical Charts and Planning, Federal Aviation Administration (FAA), available at https://web.archive.org/web/20211025202857/https://www.faa.gov/air_traffic/flight_info/aeronav/digital_products/ifr/ (archived Oct. 25, 2017).
European Patent Office, Examination Report received in EP Application No. 22206954.4, Feb. 17, 2025, 8 pages.
European Patent Office, Examination Report received in EP Application No. 22207047.6, Jan. 14, 2025, 8 pages.

\* cited by examiner

212 ↘

- 236 — EXTRACT THE AREA MAP DATA FROM EACH OF THE ONE OR MORE AREA MAP COORDINATES TO EACH PIXEL OF THE PLURALITY OF PIXELS

- 238 — DETERMINE WHETHER EACH OF THE ONE OR MORE AREA MAP COORDINATES FALLS INSIDE A BOUNDARY DEFINING THE AT LEAST FIRST SET OF BACKGROUND AREA MAP DATA OR THE SECOND SET OF BACKGROUND AREA MAP DATA

- 240 — FILL EACH PIXEL WITH ONE OR MORE FILL COLORS IF THE EACH OF THE ONE OR MORE AREA MAP COORDINATE FALLS INSIDE THE BOUNDARY DEFINING THE AT LEAST FIRST SET OF BACKGROUND AREA MAP DATA OR THE SECOND SET OF BACKGROUND AREA MAP DATA

FIG.2E

```
           ┌─────────────────────────────────────────────┐
           │              FIG.2A                         │
           └─────────────────────────────────────────────┘
                              │
                              ▼
       ┌───────────────────────────────────────────────────────┐
242 ──│ DETERMINE A SCALED LOCATION OF AN INSET ON THE        │
       │ GENERATED THUMBNAIL DISPLAY BASED ON AN ORIGINAL      │
       │ INSET LOCATION OF AN ORIGINAL INSET ON THE            │
       │ RECEIVED CHART DATA FROM THE CHART VENDOR             │
       └───────────────────────────────────────────────────────┘
                              │
                              ▼
       ┌───────────────────────────────────────────────────────┐
244 ──│ DETERMINE A SCALED SIZE OF THE INSET BASED ON AN      │
       │ ORIGINAL INSET SIZE OF THE ORIGINAL INSET ON THE      │
       │ RECEIVED CHART DATA                                   │
       └───────────────────────────────────────────────────────┘
                              │
                              ▼
       ┌───────────────────────────────────────────────────────┐
246 ──│ FILL THE INSET AREA ON THE GENERATED                  │
       │ THUMBNAIL DISPLAY WITH AN INSET FILL COLOR            │
       └───────────────────────────────────────────────────────┘
                              │
                              ▼
       ┌───────────────────────────────────────────────────────┐
248 ──│ SCALE THE SCALED LOCATION IN                          │
       │ RELATION TO THE ORIGINAL SCALE SIZE                   │
       └───────────────────────────────────────────────────────┘
                              │
                              ▼
       ┌───────────────────────────────────────────────────────┐
250 ──│ SCALE THE SCALED SIZE IN RELATION                     │
       │ TO THE ORIGINAL INSET SIZE                            │
       └───────────────────────────────────────────────────────┘
```

FIG.2F

SYSTEM AND METHOD FOR CHART THUMBNAIL IMAGE GENERATION

CROSS-REFERENCE TO RELATED APPLICATIONS

The present disclosure claims the benefit under 35 U.S.C. § 119(e) of U.S. Provisional Patent Application Ser. No. 63/278,576, filed Nov. 12, 2021, entitled SYSTEMS AND METHODS FOR GENERATION, SELECTION, AND DISPLAY OF MAP-BASED CHART DATABASES FOR USE WITH CERTIFIED AVIONICS SYSTEMS, naming Jeff M. Henry, Kyle R. Peters, Todd E. Miller, Jason L. Wong, Reed A. Kovach, and Srinath A. Nandakumar as inventors, which is incorporated herein by reference in the entirety.

BACKGROUND

Real-world mapped areas may be curved on a large enough scale (e.g., the earth, continents, or the like) and therefore a projection type is often needed to display the curved mapped area on a flat map. However, projections often introduce skewed coordinates compared to real-world shapes. As such there is a need for a system and method for generating a plurality of images based on two or more maps, when the two or more maps are based on different projection types.

SUMMARY

A system for generating a plurality of thumbnail panels is disclosed, in accordance with one or more embodiments of the present disclosure. The system includes one or more controllers including one or more processors configured to execute a set of program instructions stored in a memory. The set of program instructions configured to cause the one or more processors to receive chart data from a chart data vendor, the chart data including at least a geographical information set; receive an area map for an area map chart vendor. The set of program instructions configured to cause the one or more processors to generate a plurality of panels based on the chart data, where each panel of the plurality of panels includes one or more panel corners. The set of program instructions configured to cause the one or more processors to project the one or more panel corners for each panel onto the received area map, where the one or more panel corners of the plurality of panels define one or more corners of a plurality of areas to be extracted. The set of program instructions configured to cause the one or more processors to determine an extraction mapping for each area to be extracted of the plurality of areas to be extracted, where the extraction mapping is configured to map each area to be extracted to a thumbnail panel of the plurality of thumbnail panels based on the one or more corners of the plurality of areas to be extracted. The set of program instructions configured to cause the one or more processors to extract area map data from each area to be extracted to generate the plurality of thumbnail panels using the determined extraction mapping. The set of program instructions configured to cause the one or more processors to generate a thumbnail display by combining each thumbnail panel of the plurality of thumbnail panels.

In some embodiments, the one or more corners for each area to be extracted may include at least one of a first corner, a second corner, a third corner, and a fourth corner.

In some embodiments, each thumbnail panel of the plurality of thumbnail panels may include at least a height and a width.

In some embodiments, the determine the extraction mapping for each area to be extracted may include: determining a first edge between the first corner and the second corner; determining a second edge between the third corner and the fourth corner; determining a quantity of the two or more extraction lines based on the height of each thumbnail panel; determining a quantity of the one or more area map coordinates for each of the two or more extraction lines based on the width of each thumbnail panel; determining a position of the first end along the first edge for each of the two or more extraction lines; determining a position of the second end along the second edge for each of the two or more extraction lines; determining an extraction line width for each of the two or more extraction lines based on the position of the first end and the position of the second end; determining a location of each of the one or more area map coordinates for each of the two or more extraction lines; and mapping each pixel of a plurality of pixels of each thumbnail panel to an area map coordinate of one of the one or more area map coordinates.

In some embodiments, the extract the area map data from each area to be extracted may include extracting the area map data from each of the one or more area map coordinates to each pixel of the plurality of pixels.

In some embodiments, at least one of the area map data or the area map may include background area map data, the background area map data may include at least a first set of background area map data and a second set of background area map data.

In some embodiments, the extracting the area map data from each of the one or more area map coordinates to the each pixel may include: determining whether each of the one or more area map coordinates falls inside a boundary defining the at least first set of background area map data or the second set of background area map data; and filling each pixel with one or more fill colors if the each of the one or more area map coordinate falls inside the boundary defining the at least first set of background area map data or the second set of background area map data.

In some embodiments, at least one of the first set of background area map data or the second set of background area map data may include at least water background area map data or land background area map data.

In some embodiments, the project the one or more panel corners for each panel of the plurality of panels onto the area map may include determining one or more geographical coordinates using an inverse projection algorithm based on the chart data for each of the one or more panel corners, the one or more geographical coordinates based on a coordinate system of the area map.

In some embodiments, the one or more controllers may be further configured to: determine a scaled location of an inset on the generated thumbnail display based on an original inset location of an original inset on the received chart data from the chart vendor; determine a scaled size of the inset based on an original inset size of the original inset on the received chart data; and filling the inset area on the generated thumbnail display with an inset fill color. The scaled location may be scaled in relation to the original inset location and the scaled size may be scaled in relation to the original inset size.

A method for generating a plurality of thumbnail panels is disclosed, in accordance with one or more embodiments of the present disclosure. The method includes receiving chart data from a chart data vendor, where the chart data includes at least a geographical information set. The method includes receiving an area map from an area map chart vendor. The method includes generating a plurality of panels based on the chart data, where each panel of the plurality of panels includes one or more panel corners. The method includes projecting the one or more panel corners for each panel onto the received area map, where the one or more panel corners of the plurality of panels define one or more corners of a plurality of areas to be extracted. The method includes determining an extraction mapping for each area to be extracted of the plurality of areas to be extracted, where the extraction mapping is configured to map each area to be extracted to a thumbnail panel of the plurality of thumbnail panels based on the one or more corners of the plurality of areas to be extracted. The method includes extracting area map data from each area to be extracted to generate the plurality of thumbnail panels using the determined extraction mapping. The method includes generating a thumbnail display by combining each thumbnail panel of the plurality of thumbnail panels.

In some embodiments, the one or more corners for each area to be extracted may include at least one of: a first corner, a second corner, a third corner, and a fourth corner.

In some embodiments, each thumbnail panel of the plurality of thumbnail panels may include at least a height and a width.

In some embodiments, each area to be extracted may include: two or more extraction lines, each of the two or more extraction lines including at least a first end, a second end, and one or more area map coordinates positioned along each of the two or more extraction lines.

In some embodiments, the projecting the one or more panel corners for each panel of the plurality of panels onto the area map may include determining one or more geographical coordinates using an inverse projection algorithm based on the chart data for each of the one or more panel corners. The one or more geographical coordinates may be based on a coordinate system of the area map.

In some embodiments, the method may include: determining a scaled location of an inset on the generated thumbnail display based on an original inset location of an original inset on the received chart data from the chart vendor; determining a scaled size of the inset based on an original inset size of the original inset on the received chart data; filling the inset area on the generated thumbnail display with an inset fill color. The scaled location may be scaled in relation to the original inset location and the scaled size may be scaled in relation to the original inset size.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2D illustrates a flow diagram depicting a method or process extracting area map data from each area to be extracted, in accordance with one or more embodiments of the present disclosure;

FIG. 2E illustrates a flow diagram depicting a method or process extracting the area map data from each of the one or more area map coordinates to each pixel of the plurality of pixels, in accordance with one or more embodiments of the present disclosure;

FIG. 2F illustrates a flow diagram depicting a method or process for chart thumbnail image generation, in accordance with one or more embodiments of the present disclosure;

DETAILED DESCRIPTION

Figure 1A:
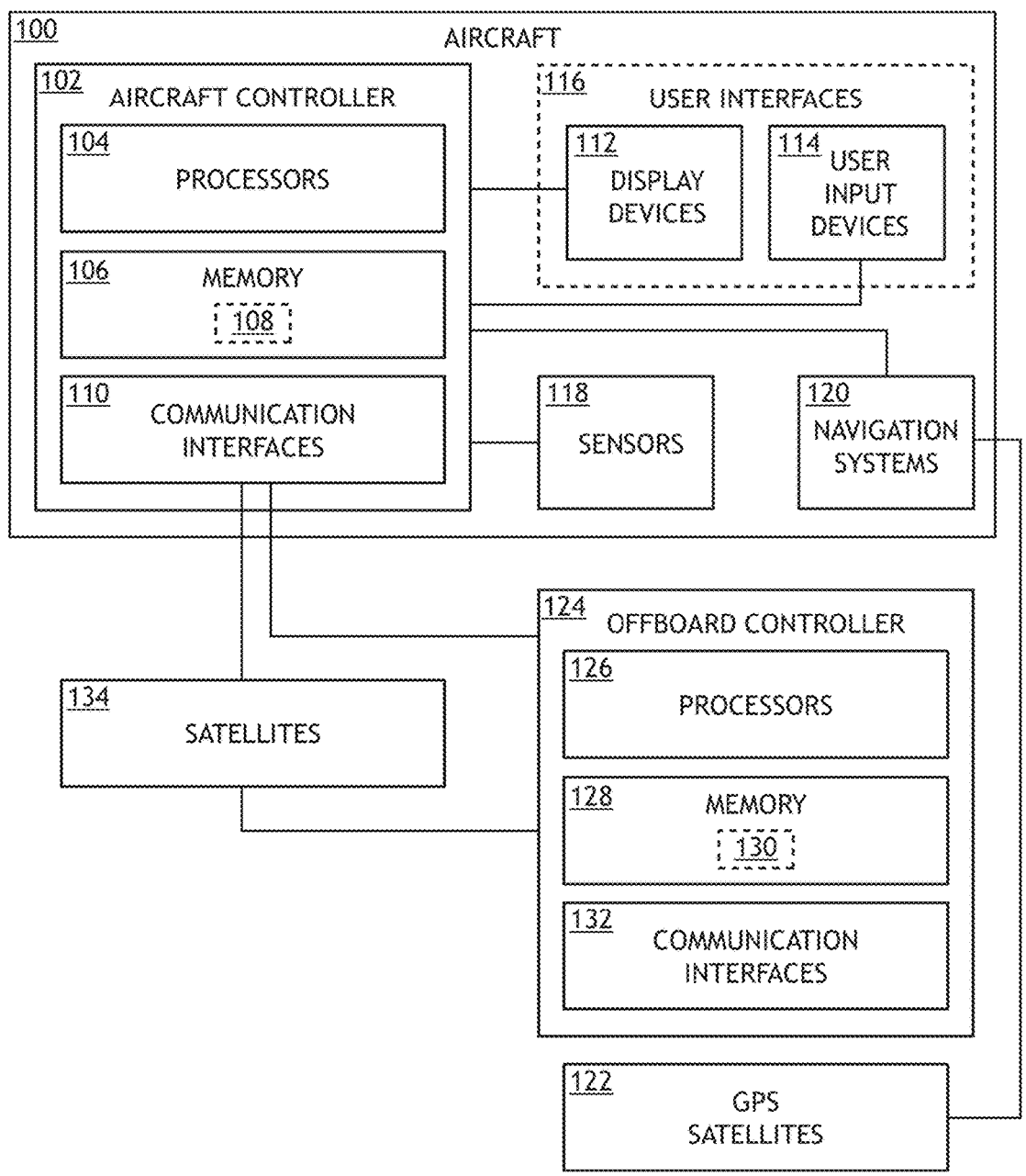
FIG. 1A illustrates a simplified block diagram of an aircraft including the system for generating thumbnails, in accordance with one or more embodiments of the present disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-6 generally illustrate a system and method for generating a plurality of thumbnail panels, in accordance with one or more embodiments of the present disclosure.

Real-world mapped areas may be curved on a large enough scale (e.g., the earth, continents, or the like) and therefore a projection type is often needed to display the curved mapped area on a flat map. For example, cartographers (i.e., mapmakers) may use a variety of dissimilar projections to show a round area on a flat map using one or more projections (e.g., Mercator projections, Lambert projections, Polar projections, and the like). However, these projections often introduce skewed coordinates compared to real-world shapes.

Further, map-viewers may gain valuable navigational information from maps, however, while viewing these charts via chart display applications they may lose situational awareness. For example, map-based charts (e.g., avionics charts, highway charts, or the like) may be massive in scale, such that it may be difficult to display an entire map-based chart all at once and access the geographical and navigational information contained therein with any acceptable level of detail. For instance, the map-based chart may be made of gigabytes of lines, shapes, and fills, which makes it very difficult to detect the portions of the chart that make up the desired map imagery, connect the coastal boundaries, create the desired shapes, and color fill the desired areas. However, by splitting a map-based chart into a sequence of component panels and displaying one panel at a time, the map-viewer may not be able to easily determine which panel or part of a map-based chart they are looking at relative to the map-based chart as a whole (or relative to their own position).

As such, a scaled down image (e.g., lower resolution thumbnail) of the entire map-based chart may be desired. However, a scaled down image of the entire map-based chart may not be easily legible, may be too complicated to provide a concise form of situational awareness, may not be in the desired shape, and/or may not be in the desired projection type. Moreover, a different shape of a scaled down image may be desired such that the scaled down image is shorter in height than just a scaled down image that maintains its aspect ratio. It is noted that the shorter height may allow the scaled down image to not occupy as much screen space while still providing situational awareness. The desired projection type may be based on what is needed in order to convert the projected boundaries of a first map-based chart into a rectangular shape. In this regard, a generated thumbnail image may allow a map-viewer to see what other panels are available for viewing and provide situational awareness for the map-viewer. Since the area a map-based chart covers may change or new map-based charts may be added or deleted, it may be desirable to extract a thumbnail image from graphical data provided by a chart vendor. The graphical data may exist in a form referred to as an area map.

As such, there is a need for a system and method of generating an image or a plurality of images based on two or more map-based charts, where the map-based charts depict the same geographical area but are in dissimilar projection types. For example, the system and method may be configured to generate a set of thumbnail panels that represent panels of chart data (e.g., an avionics chart). In this regard, the generated set of thumbnail panels may allow for movement between chart panels.

By way of another example, the system and method may be configured to allow for projecting the boundaries of panels of a first map-based chart (e.g., chart data) onto a second map-based chart (e.g., area map) and systematically extracting the data from each projected panel boundary to a thumbnail panel such that the thumbnail panels represent the same area as the first map-based chart and provide situational awareness (e.g., to a pilot). The second map-based chart may show the same geographical area as the first map-based chart, but may exist in a format that is better suited for providing situational awareness. For example, the second map-based chart may include less variety and density of information and symbols such that a scaled down version would be more simplified and readily legible at a quick glance. Further, the second map-based chart may be in a different projection type than the first map-based chart. By way of another example, the system and method may be configured to allow for systematically determining the location of area map coordinates on a second map-based chart (e.g., area map) and extracting data from the area map coordinates to pixels of thumbnail panels. By way of another example, the system and method may be configured to combine the thumbnail panels into a thumbnail display (e.g., by slightly overlapping the thumbnail panels). By way of another example, the system and method may be configured to modify the thumbnail panels or thumbnail display by adding an inset that is scaled and located relative to an original inset size and location included with the chart data.

Figure 1B:
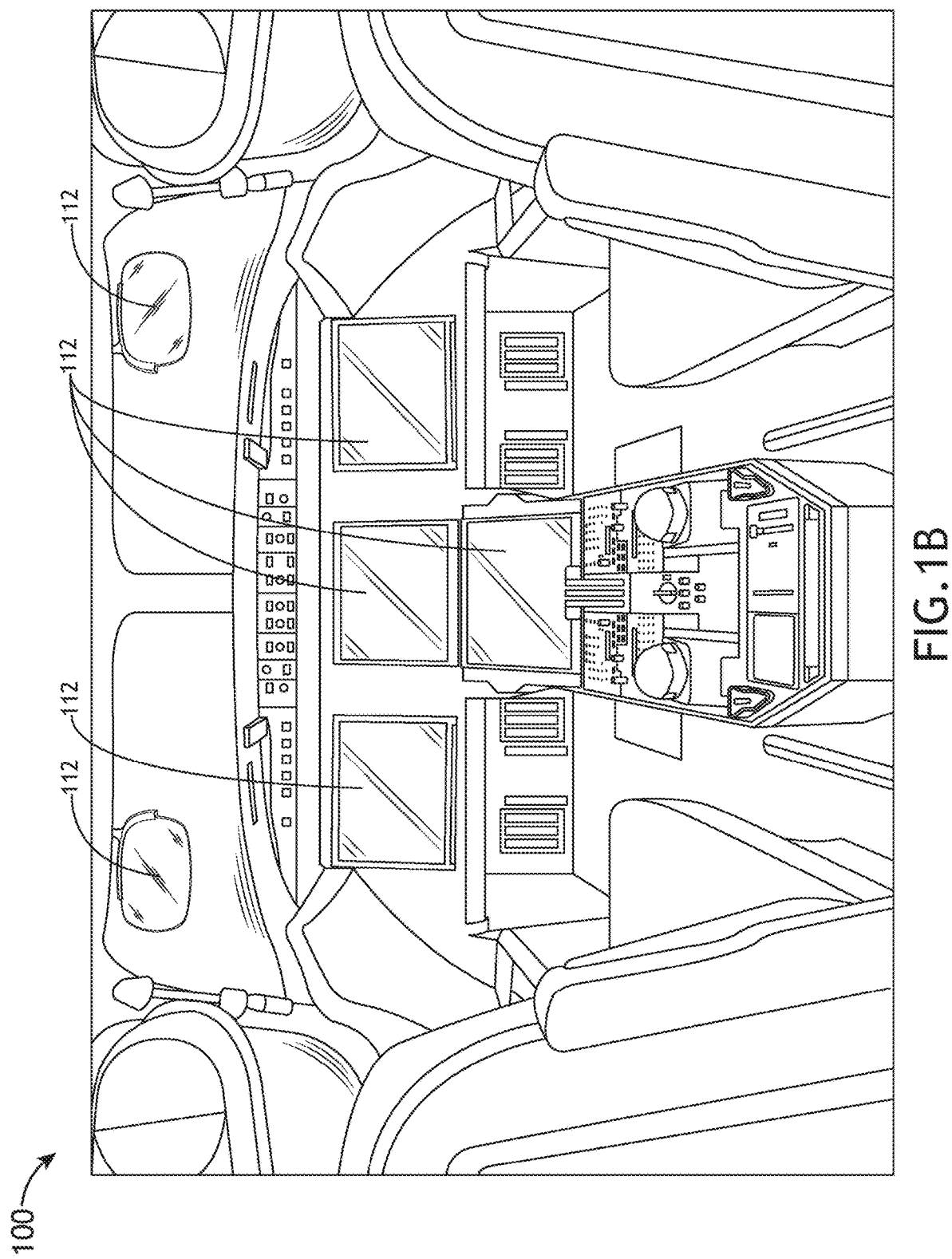
FIG. 1B illustrates an aircraft including the system for generating thumbnails, in accordance with one or more embodiments of the present disclosure.

FIGS. 1A-1B illustrate an aircraft including a system for generating chart thumbnail images, in accordance with one or more embodiments of the present disclosure.

Referring now to FIG. 1A, the aircraft 100 may include an aircraft controller 102 (e.g., on-board/run-time controller).

The aircraft controller 102 may include one or more processors 104, memory 106 configured to store one or more program instructions 108, and/or one or more communication interfaces 110.

The aircraft 100 may include an avionics environment such as, but not limited to, a cockpit. The aircraft controller 102 may be coupled (e.g., physically, electrically, and/or communicatively) to one or more display devices 112. The one or more display devices 112 may be configured to display three-dimensional images and/or two-dimensional images. Referring now to FIG. 1B, the avionics environment (e.g., the cockpit) may include any number of display devices 112 (e.g., one, two, three, or more displays) such as, but not limited to, one or more head-down displays (HDDs) 112, one or more head-up displays (HUDs) 112, one or more multi-function displays (MFDs), one or more adaptive flight displays (AFDs) 112, one or more primary flight displays (PFDs) 112, or the like. The one or more display devices 112 may be employed to present flight data including, but not limited to, situational awareness data (e.g., chart data) and/or flight queue data to a pilot or other crew member. For example, the situational awareness data (e.g., chart data) may be based on, but is not limited to, aircraft performance parameters, aircraft performance parameter predictions, sensor readings, alerts, or the like.

Referring again to FIG. 1A, the aircraft controller 102 may be coupled (e.g., physically, electrically, and/or communicatively) to one or more user input devices 114. The one or more display devices 112 may be coupled to the one or more user input devices 114. For example, the one or more display devices 112 may be coupled to the one or more user input devices 114 by a transmission medium that may include wireline and/or wireless portions. The one or more display devices 112 may include and/or be configured to interact with one or more user input devices 114.

The one or more display devices 112 and the one or more user input devices 114 may be standalone components within the aircraft 100. It is noted herein, however, that the one or more display devices 112 and the one or more user input devices 114 may be integrated within one or more common user interfaces 116.

Where the one or more display devices 112 and the one or more user input devices 114 are housed within the one or more common user interfaces 116, the aircraft controller 102, one or more offboard controllers 124, and/or the one or more common user interfaces 116 may be standalone components. It is noted herein, however, that the aircraft controller 102, the one or more offboard controllers 124, and/or the one or more common user interfaces 116 may be integrated within one or more common housings or chassis.

The aircraft controller 102 may be coupled (e.g., physically, electrically, and/or communicatively) to and configured to receive data from one or more aircraft sensors 118. The one or more aircraft sensors 118 may be configured to sense a particular condition(s) external or internal to the aircraft 100 and/or within the aircraft 100. The one or more aircraft sensors 118 may be configured to output data associated with particular sensed condition(s) to one or more components/systems onboard the aircraft 100. Generally, the one or more aircraft sensors 118 may include, but are not limited to, one or more inertial measurement units, one or more airspeed sensors, one or more radio altimeters, one or more flight dynamic sensors (e.g., sensors configured to sense pitch, bank, roll, heading, and/or yaw), one or more weather radars, one or more air temperature sensors, one or more surveillance sensors, one or more air pressure sensors, one or more engine sensors, and/or one or more optical sensors (e.g., one or more cameras configured to acquire images in an electromagnetic spectrum range including, but not limited to, the visible light spectrum range, the infrared spectrum range, the ultraviolet spectrum range, or any other spectrum range known in the art).

The aircraft controller 102 may be coupled (e.g., physically, electrically, and/or communicatively) to and configured to receive data from one or more navigational systems 120. The one or more navigational systems 120 may be coupled (e.g., physically, electrically, and/or communicatively) to and in communication with one or more GPS satellites 122, which may provide vehicular location data (e.g., aircraft location data) to one or more components/systems of the aircraft 100. For example, the one or more navigational systems 120 may be implemented as a global navigation satellite system (GNSS) device, and the one or more GPS satellites 122 may be implemented as GNSS satellites. The one or more navigational systems 120 may include a GPS receiver and a processor. For example, the one or more navigational systems 120 may receive or calculate location data from a sufficient number (e.g., at least four) of GPS satellites 122 in view of the aircraft 100 such that a GPS solution may be calculated.

It is noted herein the one or more aircraft sensors 118 may operate as a navigation device 120, being configured to sense any of various flight conditions or aircraft conditions typically used by aircraft and output navigation data (e.g., aircraft location data, aircraft orientation data, aircraft direction data, aircraft speed data, and/or aircraft acceleration data). For example, the various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. By way of another example, the one or more aircraft sensors 118 may provide aircraft location data and aircraft orientation data, respectively, to the one or more processors 104, 126.

The aircraft controller 102 of the aircraft 100 may be coupled (e.g., physically, electrically, and/or communicatively) to one or more offboard controllers 124.

The one or more offboard controllers 124 may include one or more processors 126, memory 128 configured to store one or more programs instructions 130 and/or one or more communication interfaces 132.

The aircraft controller 102 and/or the one or more offboard controllers 124 may be coupled (e.g., physically, electrically, and/or communicatively) to one or more satellites 134. For example, the aircraft controller 102 and/or the one or more offboard controllers 124 may be coupled (e.g., physically, electrically, and/or communicatively) to one another via the one or more satellites 134. For instance, at least one component of the aircraft controller 102 may be configured to transmit data to and/or receive data from at least one component of the one or more offboard controllers 124, and vice versa. By way of another example, at least one component of the aircraft controller 102 may be configured to record event logs and may transmit the event logs to at least one component of the one or more offboard controllers 124, and vice versa. By way of another example, at least one component of the aircraft controller 102 may be configured to receive information and/or commands from the at least one component of the one or more offboard controllers 124, either in response to (or independent of) the transmitted event logs, and vice versa.

It is noted herein that the aircraft 100 and the components onboard the aircraft 100, the one or more offboard controllers 124, the one or more GPS satellites 122, and/or the one or more satellites 134 may be considered components of a system 138, for purposes of the present disclosure.

The one or more processors 104, 126 may include any one or more processing elements, micro-controllers, circuitry, field programmable gate array (FPGA) or other processing systems, and resident or external memory for storing data, executable code, and other information accessed or generated by the aircraft controller 102 and/or the one or more offboard controllers 124. In this sense, the one or more processors 104, 126 may include any microprocessor device configured to execute algorithms and/or program instructions. It is noted herein, however, that the one or more processors 104, 126 are not limited by the materials from which it is formed or the processing mechanisms employed therein and, as such, may be implemented via semiconductor(s) and/or transistors (e.g., using electronic integrated circuit (IC) components), and so forth. In general, the term "processor" may be broadly defined to encompass any device having one or more processing elements, which execute a set of program instructions from a non-transitory memory medium (e.g., the memory), where the set of program instructions is configured to cause the one or more processors to carry out any of one or more process steps.

The memory 106, 128 may include any storage medium known in the art suitable for storing the set of program instructions executable by the associated one or more processors. For example, the memory 106, 128 may include a non-transitory memory medium. For instance, the memory 106, 128 may include, but is not limited to, a read-only memory (ROM), a random access memory (RAM), a magnetic or optical memory device (e.g., disk), a magnetic tape, a solid state drive, flash memory (e.g., a secure digital (SD) memory card, a mini-SD memory card, and/or a micro-SD memory card), universal serial bus (USB) memory devices, and the like. The memory 106, 128 may be configured to provide display information to the display device (e.g., the one or more display devices 112). In addition, the memory 106, 128 may be configured to store user input information from a user input device of a user interface. The memory 106, 128 may be housed in a common controller housing with the one or more processors. The memory 106, 128 may, alternatively or in addition, be located remotely with respect to the spatial location of the processors and/or a controller. For instance, the one or more processors and/or the controller may access a remote memory (e.g., server), accessible through a network (e.g., internet, intranet, and the like).

The aircraft controller 102 and/or the one or more offboard controllers 124 may be configured to perform one or more process steps, as defined by the one or more sets of program instructions 108, 130. The one or more process steps may be performed iteratively, concurrently, and/or sequentially. The one or more sets of program instructions 108, 130 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, Boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 108, 130 may be configured to operate via proportional control, feedback control, feedforward control, integral control, proportional-derivative (PD) control, proportional-integral (PI) control, proportional-integral-derivative (PID) control, or the like.

The one or more communication interfaces 110, 134 may be operatively configured to communicate with one or more components of the aircraft controller 102 and/or the one or more offboard controllers 124. For example, the one or more communication interfaces 110, 134 may also be coupled (e.g., physically, electrically, and/or communicatively) with the one or more processors 104, 126 to facilitate data transfer between components of the one or more components of the aircraft controller 102 and/or the one or more offboard controllers 124 and the one or more processors 104, 126. For instance, the one or more communication interfaces 110, 134 may be configured to retrieve data from the one or more processors 104, 126, or other devices, transmit data for storage in the memory 106, 128, retrieve data from storage in the memory 106, 128, or the like. By way of another example, the aircraft controller 102 and/or the one or more offboard controllers 124 may be configured to receive and/or acquire data or information from other systems or tools by a transmission medium that may include wireline and/or wireless portions. By way of another example, the aircraft controller 102 and/or the one or more offboard controllers 124 may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 102 and/or the one or more offboard controllers 124 and the other subsystems (e.g., of the aircraft 100 and/or the system 138). In addition, the aircraft controller 102 and/or the one or more offboard controllers 124 may be configured to send data to external systems via a transmission medium (e.g., network connection).

The one or more display devices 112 may include any display device known in the art. For example, the display devices 112 may include, but are not limited to, one or more head-down displays (HDDs), one or more HUDs, one or more multi-function displays (MFDs), or the like. For instance, the display devices 112 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 114 may include any user input device known in the art. For example, the user input device 114 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 2A:
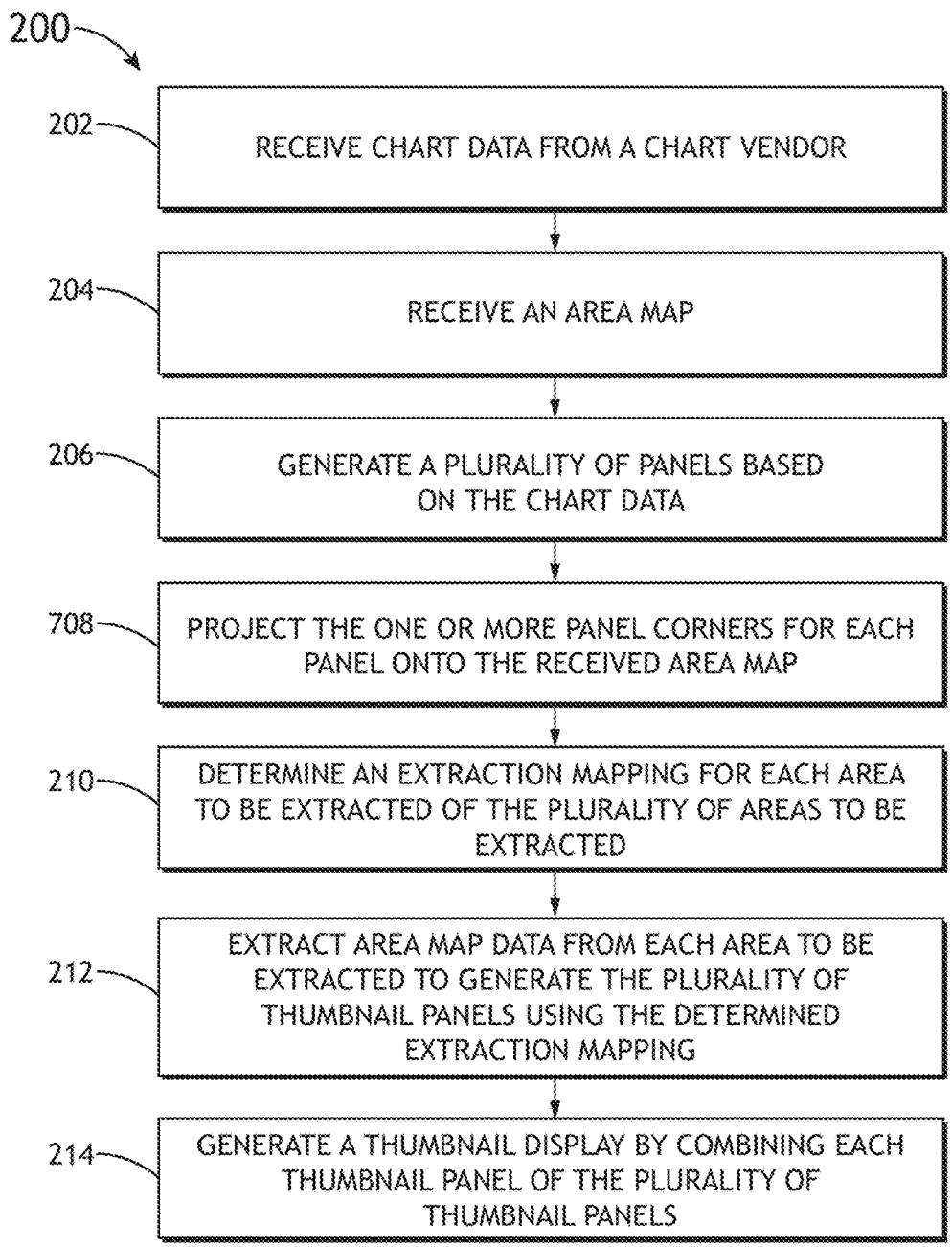
FIG. 2A illustrates a flow diagram depicting a method or process for chart thumbnail image generation, in accordance with one or more embodiments of the present disclosure.
Figure 3A:
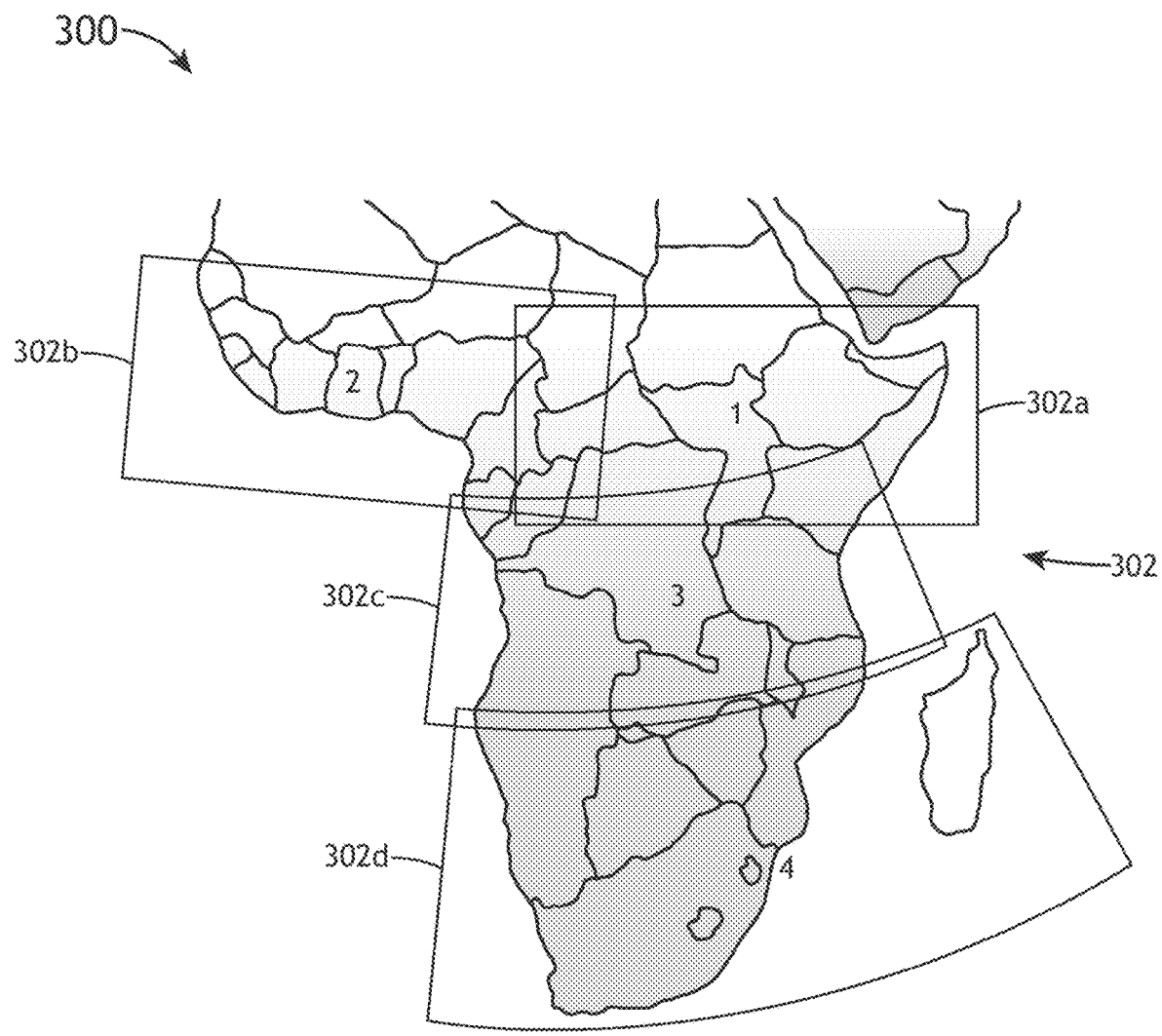
FIG. 3A illustrates a simplified schematic of an example area map including superimposed projected chart data boundaries, in accordance with one or more embodiments of the present disclosure.
Figure 3B:
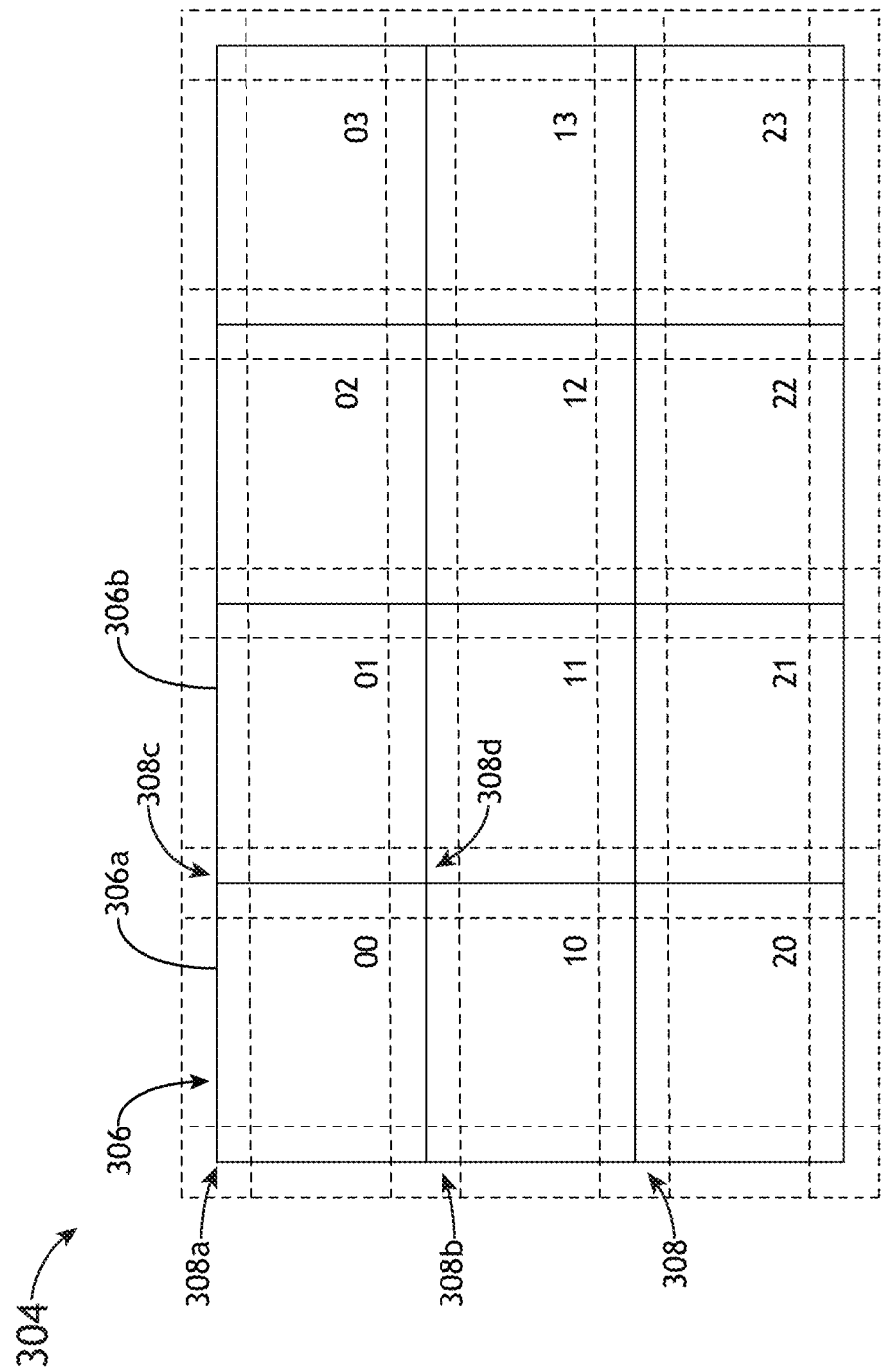
FIG. 3B illustrates a plurality of panels of chart data, in accordance with one or more embodiments of the present disclosure.
Figure 4:
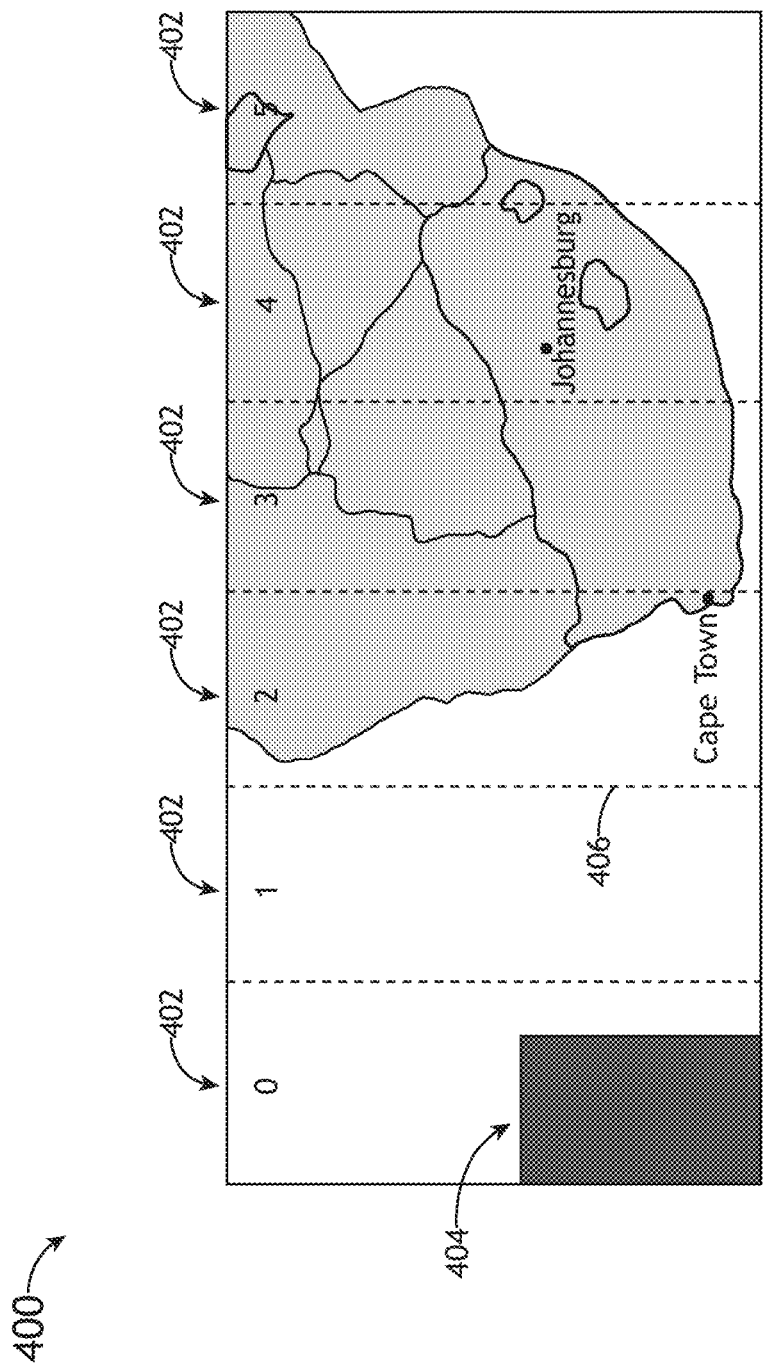
FIG. 4 illustrates a thumbnail display, in accordance with one or more embodiments of the present disclosure.
Figure 5:
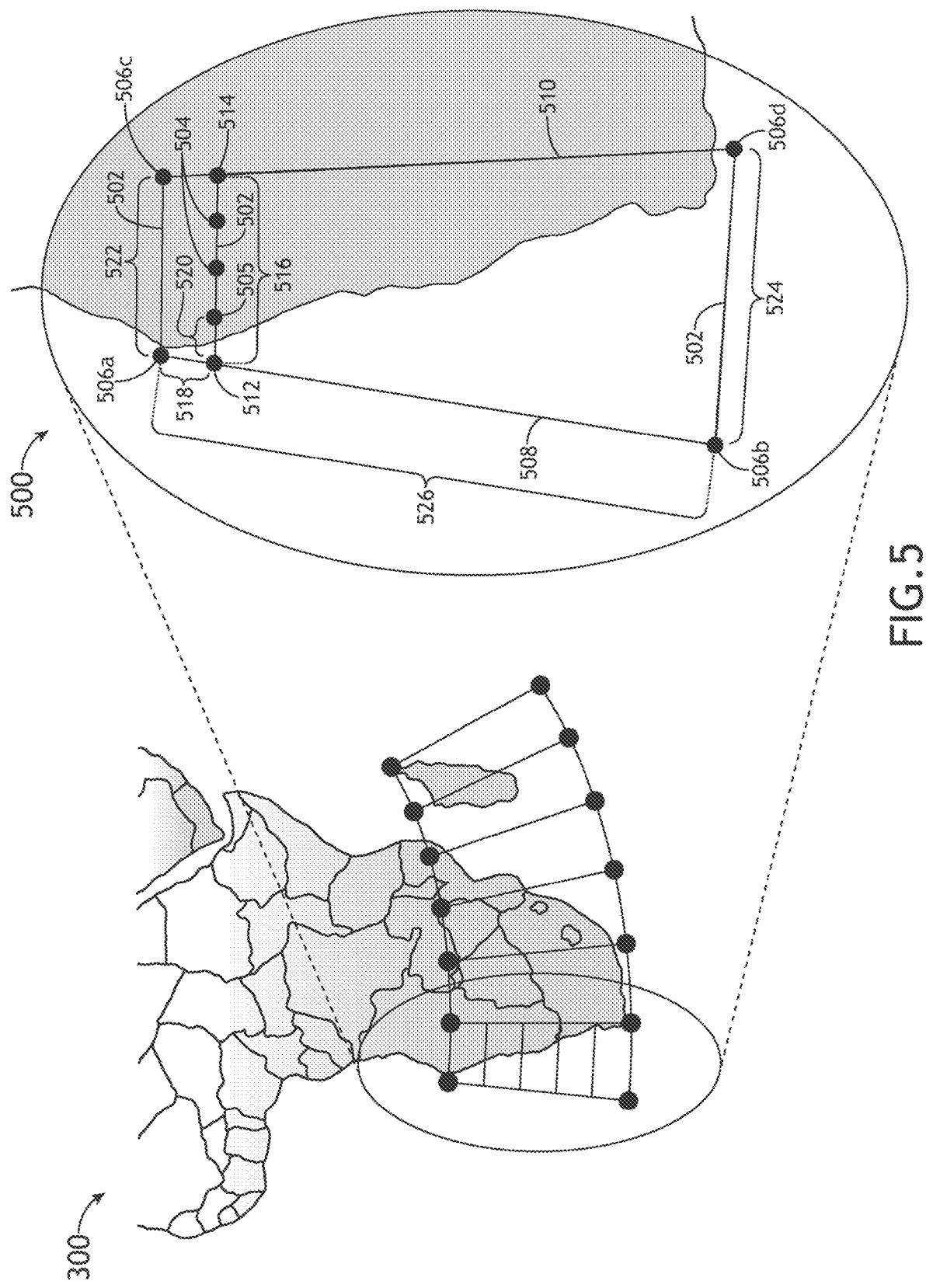
FIG. 5 illustrates a detailed view of an area to be extracted of an area map, including an extraction line and area map coordinates, in accordance with one or more embodiments of the present disclosure.
Figure 6:
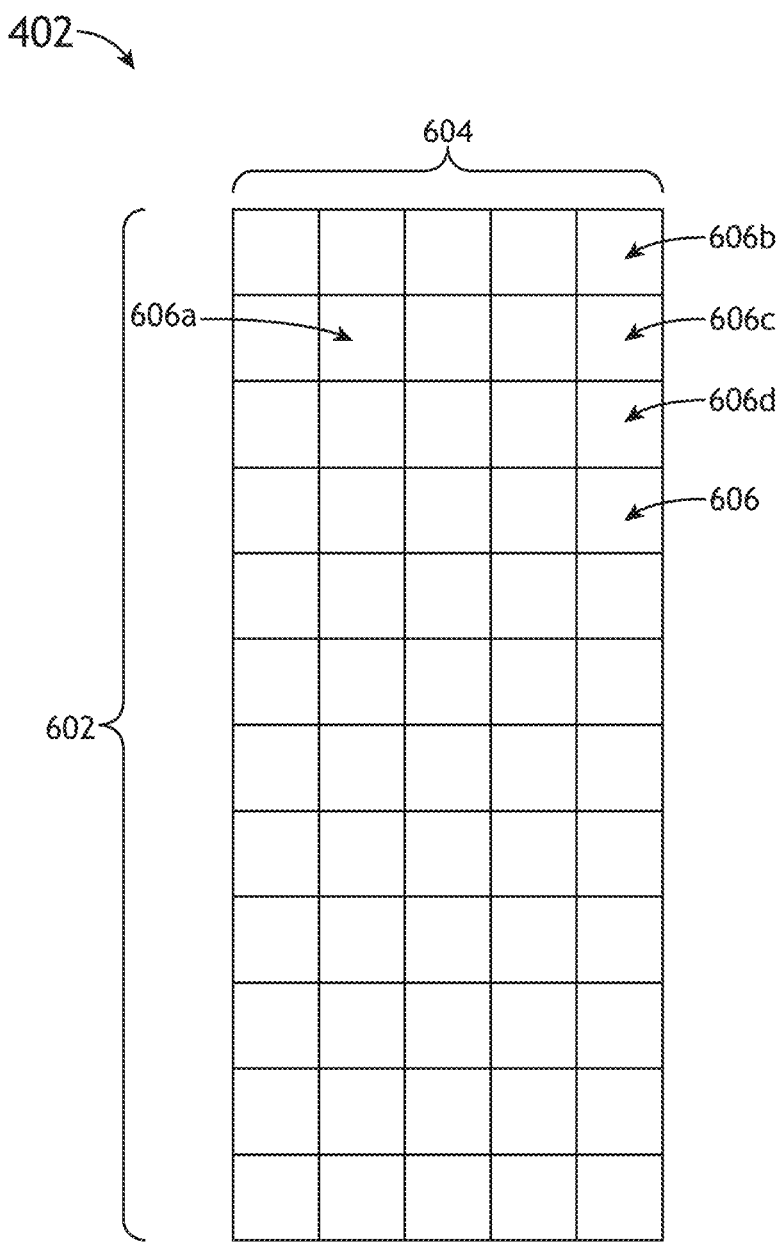
FIG. 6 illustrates a thumbnail panel including pixels, in accordance with one or more embodiments of the present disclosure.

FIG. 2A-2F generally illustrates a method for generating a plurality of thumbnail panels 302, in accordance with one or more embodiments of the present disclosure. FIGS. 3A-6 generally illustrate a system for generating a plurality of thumbnail panels, in accordance with one or more embodiments of the present disclosure. In particular, FIG. 3A depicts an area map 300, in accordance with one or more embodiments of the present disclosure. In particular, FIG. 3B depicts an avionics chart 304 separated into a plurality of display panels 306 (e.g., a first panel 306a, a second panel 306b, and the like), in accordance with one or more embodiments of the present disclosure. In particular, FIG. 4 depicts a thumbnail display after data is extracted 400, in accordance with one or more embodiments of the present disclosure. In particular, FIG. 5 depicts an area to be extracted 500 of an area map 300, in accordance with one or more embodiments of the present disclosure. In particular, FIG. 6 depicts a thumbnail panel 402 with pixels 606, in accordance with one or more embodiments of the present disclosure. It is noted that the embodiments and enabling technologies described herein in the context of the system 138 and/or one or more components of the system should be interpreted to extend to the method 200. It is further noted, however, that the method 200 is not limited to the architecture of the system 100.

In a step 202, chart data may be received from a chart vendor. For example, the offboard controller 124 may be configured to receive chart data for an avionics chart from a chart vendor. It is noted that the system 100 may be configured to receive any type of chart data from any chart vendor. For example, the system 100 may be configured to receive enroute chart data from an enroute chart data vendor. By way of another example, the system 100 may be configured to receive terminal chart data from a terminal chart vendor.

In a step 204, an area map may be received. For example, the offboard controller 124 may be configured to receive an area map, such as the area map 300 shown in FIG. 3A. For instance, the offboard controller 124 may be configured to receive an area map 300 from a chart vendor. It is noted that the area map chart vendor may be the same chart vendor as the chart data chart vendor. Further, it is noted that the area map chart vendor may be a separate chart vendor.

Referring to FIG. 3A, the area map 300 is shown with one or more superimposed projected chart data boundaries 302 (e.g., a first boundary 302a, a second boundary 302b, a third boundary 302c, and a fourth boundary 302d). The one or more superimposed projected chart boundaries 302 (e.g., a first boundary 302a, a second boundary 302b, a third boundary 302c, and a fourth boundary 302d) may define one or more geographic areas (denoted by 1-4 in FIG. 3A) shared between the chart data and the area map 300. Although FIG. 3A depicts an area map of Africa including one or more boundaries 302, it is noted that the system may be configured to receive any type of area map 300. FIG. 3A, is provided merely for illustrative purposes and shall not be construed as limiting the scope of the present disclosure.

It is noted that the projection types (e.g., Mercator, Lambert, Polar, or the like) of the chart data and the area map 300 may be dissimilar. For example, the chart data may appear to be rectangular when displayed in its native/original form but have a shape that is an annular sector (e.g., as shown by example boundary 302d in FIG. 3A) or trapezoid when the geographic coordinates of the boundaries of chart data (e.g., as shown by corner 506a, corner 506b, corner 506c, and corner 506d in FIG. 5) are accurately projected to matching geographic locations on area map 300.

In a step 206, the received avionics chart may be separated into a plurality of panels 306 based on the received chart data (in step 202). For example, the offboard controller 124 may be configured to generate a plurality of panels, such as the panels 306 shown in FIG. 3B (e.g., a first panel 306a and a second panel 306b), based on the received chart data. By way of another example, an additional (or external controller) may be configured to separate the avionics chart 304 into a plurality of panels 306 and generate a plurality of output files including the panel data. For instance, the offboard controller 124 may be configured to receive the plurality of output files including panel data from the additional controller (or external controller). Panel generation is generally discussed in U.S. patent application Ser. No. 17/525,184, filed on Nov. 12, 2021, which is herein incorporated by reference in the entirety.

The avionics chart 304 may be separated into a plurality of panels 306 via the offboard controller 124 or an additional (or external) controller. Each panel 306 of the plurality of panels 306 may include one or more panel corners 308. For example, each panel 306 of the plurality of panels 306 may include a first panel corner 308a, a second panel corner 308b, a third panel corner 308c, and a fourth panel corner 308d. Although FIG. 3B depicts the panel 306 including four panel corners 308a-308d, it is noted that the panel 306 may include any number of corners.

Although not shown in FIG. 3B, the offboard controller 124 (or the external/additional controller) may be configured to further divide a panel 306 into a plurality of panels 306 based on a predetermined threshold size. For example, if the chart data size exceeds the predetermined threshold, then the offboard controller 124 (or external/additional controller) may be configured to further divide the panel 306 into a plurality of panels 306 to decrease the size of the panels 306, such that the system may be able to display the panels 306.

Although FIG. 3B depicts a specific number, size, shape, and arrangement of panels, it is noted that FIG. 3B is provided merely for illustrative purposes and shall not be construed as limiting the scope of the present disclosure. For example, the avionics chart 304 may be separated into a single row of multiple panels 306. By way of another example, the avionics chart 304 may be separated into a plurality of rows, where each row includes a plurality of panels 306. Further, the panel 306 may be a polygon such as, but not limited to, a quadrilateral (e.g., a square, rectangle, or the like), and the like.

In an optional step, the offboard controller 124 may be further configured to extract and store area map background data of area map 300 (e.g., water background, land background, country borders, and other symbology). For example, the stored area map background data may be a set of shapes that are located in a defined layer of the area map

300. For instance, the area map 300 may be replaced with a stored area map background data extracted from the area map 300. In this regard, in a step 212 (as discussed further herein), the area map 300 may be replaced with stored area map background data. In this regard, the stored area map background data may be extracted, such that the area to be extracted 500 may be located on the stored area map background data. For example, the offboard controller 124 may be configured to determine whether each area map coordinate 504 falls inside the land background based on the stored area map background data.

In a step 208, the one or more panel corners 308 for each panel 306 may be projected onto the received area map 300. The one or more panel corners 308 of each panel 306 may define one or more corners 506 of a plurality of areas to be extracted 500. For example, the offboard controller 124 may be configured to project the one or more panel corners 308 for each panel 306 onto the received area map 300, such that the one or more panel corners 308 of the plurality of panels 306 may define one or more corners 506 (e.g., a first corner 506a, a second corner 506b, a third corner 506c, and a fourth corner 506d) of a plurality of areas to be extracted 500.

The area to be extracted 500 may be defined by one or more corners 506. For example, the area to be extracted 500 may be defined by a first corner 506a, a second corner 506b, a third corner 506c, a fourth corner 506d, . . . up to an N number of corners 506. The projection of the one or more corners 506 may be determined based on an inverse projection algorithm associated with the chart data. For example, the offboard controller 124 may be configured to project the one or more corners 506 for each panel 306 onto the received area map 300 using an inverse projection algorithm associated with chart data. It is noted that the one or more corners 506 may be geographical coordinates (e.g., cartesian coordinates, latitude/longitude, or the like), and may be configured to be used in a coordinate system of area map 300. Although FIG. 5 depicts a specific number of corners (e.g., a first corner 506a, a second corner 506b, a third corner 506c, and a fourth corner 506d), it is noted that the area to be extracted 500 may be defined by any number of one or more corners 506. Further, it is noted that the area to be extracted 500 may be any shape suitable for projection. For example, the area to be extracted 500 may be in a trapezoid shape. By way of another example, the area to be extracted 500 may be in an annular sector shape or a rectangular shape.

Figure 2B:
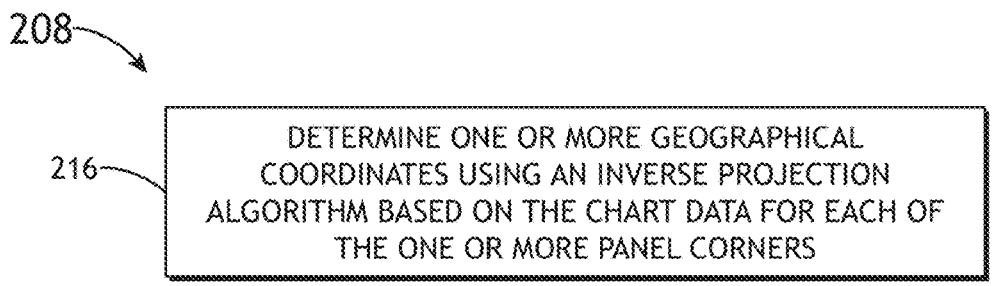
FIG. 2B illustrates a flow diagram depicting a method or process projecting the one or more panel corners for each panel onto the received area map, in accordance with one or more embodiments of the present disclosure.

FIG. 2B illustrates a flowchart depicting a method or process 208 for projecting the one or more panel corners for each panel onto the received area map, in accordance with one or more embodiments of the disclosure.

In a step 216, one or more geographical coordinates may be determined using an inverse projection algorithm based on the chart data for each of the one or more panel corners. The one or more geographical coordinates may be based on a coordinate system of the area map. For example, the offboard controller 124 may be configured to determine one or more geographical coordinates using an inverse projection algorithm based on the chart data for each of the one or more panel corners.

Referring back to FIG. 2A, in a step 210, an extraction mapping for each area to be extracted 500 of the plurality of areas to be extracted 500 may be determined. The extraction mapping may be configured to map each area to be extracted 500 to a thumbnail panel 402 of the plurality of thumbnail panels 402 based on the one or more corners 506 of the plurality of areas to be extracted 500. For example, the offboard controller 124 may be configured to determine an extraction mapping for each area to be extracted 500 of the plurality of areas to be extracted 500, such that the extraction mapping may be configured to map each area to be extracted 500 to a thumbnail panel 402 of the plurality of thumbnail panels 302 (as shown in FIG. 4) based on the one or more corners 506 of the plurality of areas to be extracted 500.

Referring to FIG. 5, an area to be extracted 500 of an area map 300 may include a plurality of extraction lines 502 and a plurality of area map coordinates 504. Although FIG. 5 depicts a specific number and spacing of extraction lines 502 and area map coordinates 504, it is noted that FIG. 5 is provided merely for illustrative purposes and shall not be construed as limiting the scope of the present disclosure. For example, the area to be extracted 500 may include any number and configuration of extraction lines 502. By way of another example, the area to be extracted 500 may include any number and configuration of area map coordinates 504.

Figure 2C:
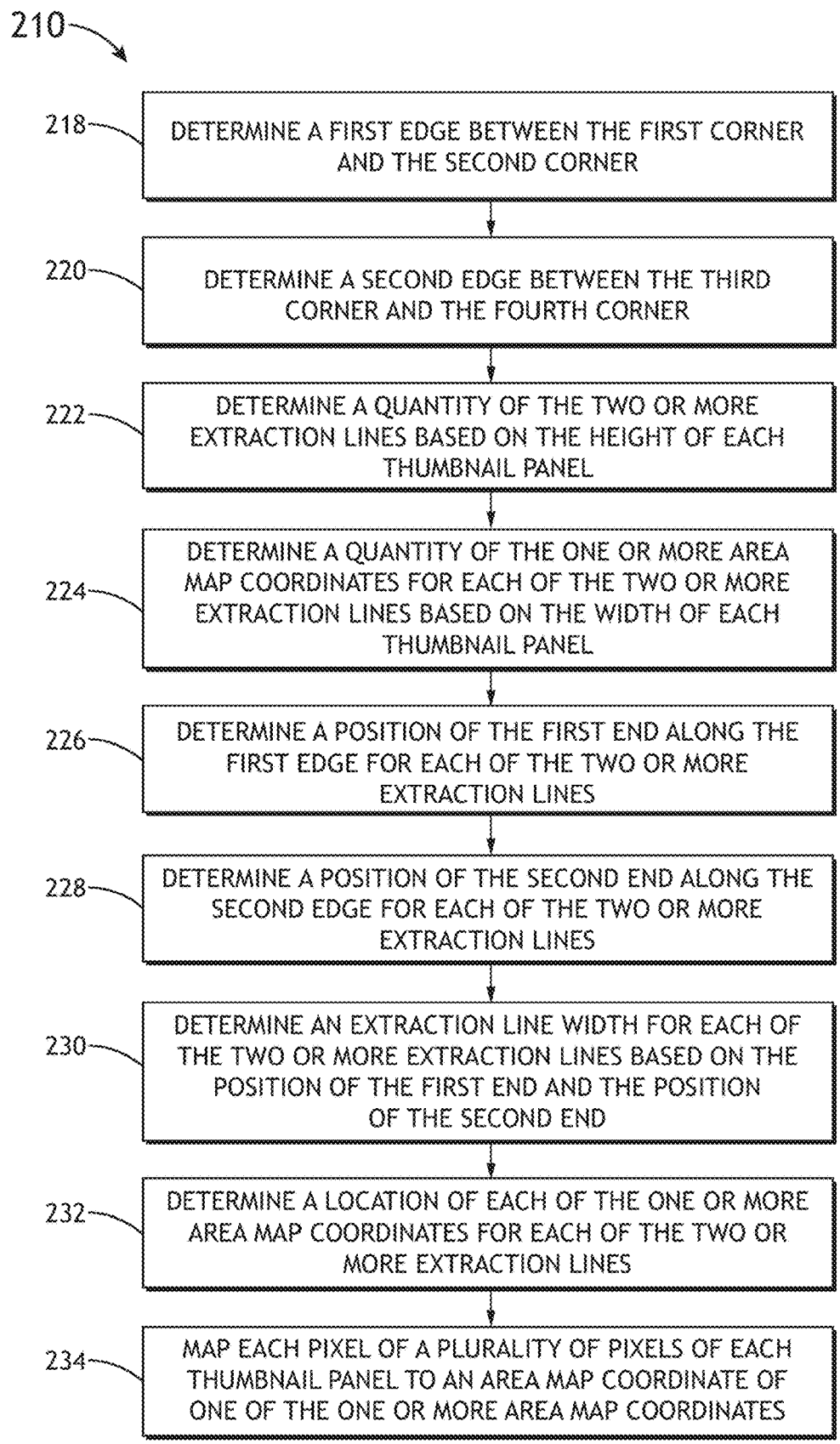
FIG. 2C illustrates a flow diagram depicting a method or process for determining an extraction mapping for each area to be extracted of the plurality of areas to be extracted, in accordance with one or more embodiments of the present disclosure.

Referring to FIG. 2C, the determine the extraction mapping for each area to be extracted of step 210 may include one or more of steps 218-234. It is noted that the embodiments and enabling technologies described herein in the context of the method or process 200 should be interpreted to extend to the method 210.

In a step 218, a first edge 508 between the first corner 506a and the second corner 506b may be determined. For example, the offboard controller 124 may be configured to determine a first edge 508 between the first corner 506a and the second corner 506b. For instance, the offboard controller 124 may be configured to determine the first edge 508 by determining a line between the first corner 506a and the second corner 506b.

In a step 220, a second edge 510 between the third corner 506c and the fourth corner 506d may be determined. For example, the offboard controller 124 may be configured to determine a second edge 510 between the third corner 506c and the fourth corner 506d. For instance, the offboard controller 124 may be configured to determine an additional edge 510 by determining a line between the third corner 506c and the fourth corner 506d.

In a step 222, a quantity of the two or more extraction lines 502 based on the height 602 of each thumbnail panel 402 may be determined. For example, the offboard controller 124 may be configured to determine a quantity of the two or more extraction lines 502 based on the height 602 of each thumbnail panel 602. For instance, a number (i.e., a number in quantity form) of the two or more extraction lines 502 to be used for the extraction mapping based on a height 602 of corresponding thumbnail panel 304. It is noted that the height 602 may be a pixel height 602 of the corresponding thumbnail panel 304 measured by the number of pixels 606 (e.g., pixel 606b, pixel 606c, pixel 606d) spanning the height 602 of the corresponding thumbnail panel 304.

For example, the determined quantity of the two or more extraction lines 502 may be equal to the height 602 (in pixels) of each thumbnail panel 402. For instance, in a non-limiting example, if the pixel height 602 of thumbnail panel 304 is 150 pixels, the number (or quantity) of the two or more extraction lines may be 150.

By way of another example, the determined quantity of the two or more extraction lines 502 may be greater than the height 602 of each thumbnail panel 402. For instance, in a non-limiting example, if the pixel height 602 of the thumbnail panel 304 is 150 pixels, the number (or quantity) of the two or more extraction lines may be greater than 150. It is noted that in this example the two or more extraction lines 502 may overlap one another.

In a step 224, a quantity of the one or more area map coordinates 504 for each of the two or more extraction lines 502 based on the width 604 of each thumbnail panel 402 may be determined. It is noted that the width 604 of each thumbnail panel 402 may be a pixel width 604 measured by the number of pixels spanning the width 604 of the corresponding thumbnail panel 304. For example, the offboard controller 124 may be configured to determine a quantity of the one or more area map coordinates 504 for each of the two or more extraction lines 502 based on the width 604 of each thumbnail panel 402. For instance, the offboard controller 124 may be configured to determine a quantity of the one or more area map coordinates 504 for each of the two or more extraction lines 502 to be equal to the width 604 of each thumbnail panel 402.

Each of the one or more area map coordinates 504 may define a small mathematical area to be extracted of the area map 300. It is noted that the small mathematical area to be extracted may surround each of the one or more area map coordinates 504. Further, it is noted that the small mathematical area to be extracted may be any shape. For example, the small mathematical area to be extracted may be trapezoidal in shape. Further, it is noted that the small mathematical area to be extracted may vary in size as the width 516 of an extraction line 502 varies. For example, there may be a shorter extraction line 502 towards the narrow portion of a trapezoid-shaped area to be extracted 500 (e.g., the extraction line 502 towards the top of area to be extracted 500 of FIG. 5) and a longer extraction line 502 towards the wider portion (e.g., lower portion) of the trapezoid-shaped area to be extracted 500. It is noted that because the width of a thumbnail panel 402 may be constant, the quantity of area map coordinates 504 may be constant for each extraction line 502. Further, as the extraction line widths 516 gets wider, the spacing between each area map coordinate 504 on the wider extraction lines 502 may get wider as a result. As a result, in this example, a small mathematical area to be extracted of an area map coordinate 504 of a shorter extraction line 502 may be smaller in size than a small mathematical area to be extracted of an area map coordinate 504 that is located on a relatively wider extraction line 502. For instance, a first small mathematical area to be extracted may be smaller than a second small mathematical area to be extracted of a different extraction line 502. Further, it is noted that the small mathematical area to be extracted of an area map coordinate 504 may be used to extract the geometry of the area map 300. It is noted that the geometry, rather than the pixels, of the area map 300, but may be used to determine whether a small mathematical area to be extracted of an area map coordinate 504 should be represented by or associated with a pixel 606 of a predetermined color. It is noted that pixels of the area map 300 that are located in the small mathematical area to be extracted of an area map coordinate 504 may be grouped and used to determine the color of a pixel 606 of the thumbnail panel 402 during an extraction. Further, it is noted that the small mathematical area to be extracted may be converted to a rectangle that is one pixel high on the thumbnail panel 402. For example, the offboard controller 124 may be configured to identify filled geometry area definitions that cross a border of the small mathematical area to be extracted and using such an identification to fill a rectangle that is one pixel high on the thumbnail panel 402.

In a step 226, a position of the first end 512 of the extraction line 502 along the first edge 508 for each of the two or more extraction lines 502 may be determined. For example, the offboard controller 124 may be configured to determine a position of the first end 512 along the first edge 508 for each of the two or more extraction lines 502. For instance, a position of first end 512 of extraction line 502 along first edge 508 for each of the two or more extraction lines 502 may be determined such that the positions of 150 extraction line first ends 512 starting at first corner 506a and ending at second corner 506b are evenly spaced from each other. In this regard, a height of the extraction line (i.e., the height defining a height of a mathematical area to be extracted of each extraction line 502) may be determined by taking the length 526 of the first edge 508 divided by the quantity of the number of extraction lines 502. It is noted that the height of the extraction line may be higher than one pixel of an area map 300.

In a step 228, a position of the second end 514 along the second edge 510 for each of the two or more extraction lines 502 may be determined. For example, the offboard controller 124 may be configured to determine a position of the second end 514 along the second edge 510 for each of the two or more extraction lines 502. In this regard, a height of the extraction line (not shown; i.e., the height defining a height of a mathematical area to be extracted of each extraction line 502) may be determined by taking the height of the second edge 510 divided by the quantity of the number of extraction lines 502.

In a step 230, an extraction line width 516 for each of the two or more extraction lines 502 based on the position of the first end 512 and the position of the second end 514 may be determined. For example, the offboard controller 124 may be configured to determine an extraction line width 516 for each of the two or more extraction lines 502 based on the position of the first end 512 and the position of the second end 514.

In a step 232, a location of each of the one or more area map coordinates 504 for each of the two or more extraction lines 502 may be determined. For example, the offboard controller 124 may be configured to determine a location of each of the one or more area map coordinates 504 for each of the two or more extraction lines 502. For instance, the offboard controller 124 may be configured to determine a location of each area map coordinate 504 of each extraction line 502 (e.g., each area map coordinate 504 may be equally spaced along extraction line 502, first area map coordinate (e.g., furthest one on the left of FIG. 5) may be on first edge 508, and last area map coordinate (e.g., furthest one on the right of FIG. 5) may be on second edge 510).

In a step 234, a pixel (e.g., pixel 606a, pixel 606b, pixel 606c, and pixel 606d of FIG. 6) of a plurality of pixels 606 of each thumbnail panel 402 may be mapped to an area map coordinate 504 of one of the one or more area map coordinates 504. For example, the offboard controller 124 may be configured to map each pixel 606 of a plurality of pixels 606 of each thumbnail panel 402 to an area map coordinate 504 of one of the one or more area map coordinates 504. Referring to FIG. 6, a thumbnail panel 402 may include pixels 606. Although FIG. 6 depicts a specific number of pixels 606, it is noted that FIG. 6 is provided merely for illustrative purposes and shall not be construed as limiting the scope of the present disclosure. In another example, each thumbnail panel of the plurality of thumbnail panels may include at least a height 602 of FIG. 6 and a width 604.

The mapping of each pixel 606 may include correlating or associating each pixel 606 to an area map coordinate 504 such that when an extraction occurs, data from an area map coordinate 504 is extracted to that pixel 606. For example, the example pixel 606a of FIG. 6 may be mapped to an example area map coordinate 505 in FIG. 5. For instance, a second row of pixels 606 (e.g., the second to the top-most row of pixels 606 in FIG. 6) of the example thumbnail panel 304 may be mapped to the second extraction line 502 (e.g., the second to the top-most extraction line 502 of FIG. 5) of area to be extracted 500. Continuing with the above instance, the example pixel 606a then may be mapped to the example area map coordinate 505. Next, the third (i.e., third to the left-most) pixel 606 of the second row may be mapped to the (i.e., third to the left-most) area map coordinate 504 of the second extraction line 502. This pattern may continue until every pixel 606 of the second row, (e.g., iteratively from first to last), is mapped to a corresponding area map coordinate 504 of the second extraction line 502. Similarly, the area map coordinates 504 of each extraction line 502, may be extracted row by row (e.g., from first to last, (e.g., top to bottom) (i.e., from first corner 506a and third corner 506c to second corner 506b and fourth corner 506d)), in order, to corresponding pixels 606 of the pixel rows of thumbnail panel 402. It is noted that this may allow for a mapping where the relative positions of the pixels 606 to each other is maintained when each pixel 606 is mapped to a corresponding area map coordinate 504 (i.e., a projection and mapping where the area to be extracted 500 is mapped and extracted in a way that maintains the original order and arrangement of the area map coordinates 504 relative to each other). In the instance described above, the description of mapping may have started with describing the mapping of example pixel 606a (i.e., the second pixel in the second row) to example area map coordinate 505, however, this is merely for illustrative purposes and the mapping in the instance above may have started with a first pixel 606 in the first pixel row (i.e., from left to right, top row to bottom row). Further, an extraction may be done in any direction or order. For example, an extraction may be performed in any order of pixels or area map coordinates (e.g., right to left, bottom to top, or random).

Further, it is to be understood that thumbnail panels 402 may have artifacts (i.e., missing pixels 606 on the edges of the thumbnail panels 402). In an optional step, the beginning of the next extraction line 502 for an adjacent area to be extracted 500 (e.g., area to be extracted 500 which is located to the right of the previous area to be extracted 500) may be started at the last (e.g., right-most) area map coordinate 504 from the previous area to be extracted 500. For example, the offboard controller 124 may be further configured to start the beginning of the next extraction line 502 for the adjacent area to be extracted 500 at the last area map coordinate 504 from the previous area to be extracted 500, which may help remove artifacts (e.g., a missing color on the panel boundaries/edges).

Referring back to FIG. 2A, in a step 212, area map data from each area to be extracted 500 may be extracted to generate the plurality of thumbnail panels 402 using the determined extraction mapping. For example, the offboard controller 124 may be configured to extract area map data from each area to be extracted to generate the plurality of thumbnail panels using the determined extraction mapping. Referring to FIG. 2D, for instance, in a step 236, the extract the area map data from each area to be extracted 500 of step 212 may include extracting the area map data from each of the one or more area map coordinates 504 to each pixel 606 of the plurality of pixels 606. In this regard, the offboard controller 124 may be configured to extract the area map data from each of the one or more area map coordinates 504 to each pixel 606 of the plurality of pixels 606.

A thumbnail panel 402 size may be determined or selected. For example, thumbnail panel 402 size may be a pixel size (e.g., a pixel height and pixel width) and the pixel size may be determined or selected. In this regard, offboard controller 124 may be configured to select a thumbnail panel size of a thumbnail panel 402. In another instance, offboard controller 124 may be configured to determine thumbnail panel sizes (and/or thumbnail display sizes) based on chart data and/or the number and arrangement of chart panels 306. In another example, the offboard controller 124 may be configured to receive the arrangement and size of thumbnail panels 402. In addition, the offboard controller 124 may be configured to generate an arrangement and size of thumbnail panels 400 based on chart data and/or the number and arrangement of panels 306. It is noted that the panel size may be based on a size that is easy for a user to point at and click with a user-input device (e.g., a touchscreen, cursor, or the like) during operation of the aircraft (e.g., while an aircraft is moving). For example, in a non-limiting example, the panel 306 size may be 10 inches square.

The thumbnail display 400 may include a plurality of thumbnail panels 402, which may be variably sized. Each thumbnail panel 402 may correspond to at least one chart data panel 306, as shown in FIG. 3B, and the thumbnail display 400 may correspond to chart data. For example, the number (i.e., quantity value) of thumbnail panels 402 of thumbnail display 400 may be equal to the number of panels 306 of chart data such that there is one thumbnail panel 402 for every panel 306. Further, the arrangement and/or relative size of the thumbnail panels 402 to each other may be similar and/or identical to the arrangement and/or relative size of the panels 306 to each other. The size of thumbnail panel 402 may, however, be different than the size of panel 306. For example, offboard controller 124 may be configured to scale down the size of thumbnail panel 402 to be smaller than the size of panel 306.

FIG. 2E illustrates a flowchart depicting a method or process 236 for extracting the area map data from each of the one or more area map coordinates 504 to each pixel 606 of the plurality of pixels 606, in accordance with one or more embodiments of the disclosure.

In a step 238, whether each of the one or more area map coordinates 504 falls inside a boundary defining the at least first set of background area map data or the second set of background area map data may be determined. For example, the offboard controller 124 may be configured to determine whether each of the one or more area map coordinates 504 falls inside a boundary defining the at least first set of background area map data or the second set of background area map data.

In a step 240, if the one or more area map coordinates fall inside the boundary defining the at least first set of background area map data or the second set of background area map data, each pixel 606 may be filled with one or more fill colors. For example, the offboard controller 124 may be configured to fill each pixel 606 with one or more fill colors if each of the one or more area map coordinates 504 falls inside the boundary defining the at least first set of background area map data or the second set of background area map data.

For example, at least one of the first set of background area map data or the second set of background area map data may include at least water background area map data or land background area map data. For instance, the offboard controller 124 may be configured to determine whether each area map coordinate 504 falls inside a land background (e.g., southern tip of Africa in FIG. 5) of the area map 300 or a water background (e.g., ocean surrounding Africa). In this regard, the offboard controller 124 may be configured to fill the corresponding pixel 606 with a land fill color if area map coordinate 504 falls inside the land background; and may be configured to leave pixel 606 blank or a default color, or fill pixel 606 with a water background color, if the area map coordinate 504 falls inside the water background (e.g., the ocean surrounding Africa). It is noted that the water background may include any type of water background including, but not limited to, oceans, lakes, rivers, streams, seas, and the like. It is noted that the extraction of data may also include extracting additional data from the area map 300 to the thumbnail panel 402 such as, but not limited to, geographical boundaries, cities, or any other data contained within or associated with area map 300.

Referring back to FIG. 2A, in a step 214, a thumbnail display may be generated by combining each thumbnail panel 402 of the plurality of thumbnail panels 402. For example, the offboard controller 124 may be configured to generate a thumbnail display 400, such as the thumbnail display 400 shown in FIG. 4, by combining each thumbnail 402 panel of the plurality of thumbnail panels 402.

Referring to FIG. 4, the thumbnail display 400 may include a plurality of thumbnail panels 402. For example, the thumbnail display 400 may include a first thumbnail panel 402 (e.g., panel 0), a second thumbnail panel 402 (e.g., panel 1), a third thumbnail panel (e.g., panel 2), a fourth thumbnail panel (e.g., panel 3), a fifth thumbnail panel 402 (e.g., panel 4), and a sixth thumbnail panel 402 (e.g., panel 5). For instance, as shown in FIG. 3A, the thumbnail display 400 may correspond to example chart data having example boundaries 302d and may display the southern tip of Africa.

Although FIG. 4 depicts a specific number of thumbnail panels 402, number of rows of thumbnail panels 402, and size and shape of the thumbnail panels 402, it is noted that FIG. 4 is provided merely for illustrative purposes and shall not be construed as limiting the scope of the present disclosure. Further, although the southern tip of Africa in FIG. 4 and the inset box 404 are shaded a specific color, it is noted that the thumbnail display 400 may include any color of shading to provide contrast with the water background pixels (e.g., ocean, or the like) for increased situational awareness. Further, it is noted that for purposes of simplicity, FIG. 4 does not depict all the data (e.g., terrain, ocean names, other cities, or the like) that may be shown and/or extracted from area map 300.

It is noted that if a panel 306 is rotated at an angle (e.g., during runtime), then the thumbnail display 400 may also be rotated at a substantially similar angle. For example, if a panel 306 is rotated at an angle, then the offboard controller 124 may be configured to rotate the thumbnail display 400 at a substantially similar angle.

In an optional step, city indicators and/or city text may be added to the thumbnail panel 402 or thumbnail display 400. For example, the offboard controller 124 may be further configured to add city indicators and/or city text to the thumbnail panel 402 or thumbnail display 400. For example, the offboard controller 124 may be configured to add city indicators and/or city text based on a city list. The city list may be a user-controlled city list that allows a user to control which cities are displayed on the thumbnail chart panels 402 or thumbnail display 400. For instance, the offboard controller 124 may be further configured to receive a geographic data list. The geographic data list may include a list of cities. The geographic data list may further include cities not shown on the area map 300. The geographic data list may include city coordinates and city text for each city in the geographic data list. The offboard controller 124 may be further configured to project the city coordinates of each city of the geographic data list onto the thumbnail panel 402 or thumbnail display 400 and place an indicator (e.g., a black dot, a symbol, or the like) at that location. The offboard controller 124 may be further configured to place the city text near the indicator in such a way that the city text does not cover up other information (e.g., not overlapping other city text or thumbnail panel dividers 402). In one instance, the offboard controller 124 may be configured to add city text such as, but not limited to, "Cape Town" and "Johannesburg," as shown in FIG. 4. In another instance, the offboard controller 124 may be configured to add International Civil Aviation Organization (ICAO) airport codes to indicate the location of airports such as, but not limited to, KLAX at the location of the Los Angeles airport.

In an optional step, a flight plan may be added to the thumbnail panel 402 or thumbnail display 400. For example, the offboard controller 124 may be further configured to add a flight plan to the thumbnail panel 402 or thumbnail display 400. It is noted that a flight plan may increase situational awareness.

In an optional step, significant way points may be added to the thumbnail panel 402 or thumbnail display 400. For example, the offboard controller 124 may be further configured to add significant waypoints to the thumbnail panel 402 or thumbnail display 400.

As previously discussed herein, the projection type (e.g., Mercator, Lambert, and Polar) of thumbnail display 400 and thumbnail panels 302 may be different than the projection type of area map 300 and/or chart data and panels 306. The shape of thumbnail panel 402 may be in proportion to the shape of corresponding panel 306.

In an optional step, one or more dividers may be generated. For example, the offboard controller 124 may be configured to generate one or more dividers 406 configured to separate the adjacent thumbnail panels 402 on the thumbnail display 400. Although FIG. 4 depicts the dividers 406 as dotted lines in a specific orientation, it is noted that the one or more dividers (e.g., solid lines, dashed lines, or the like) may include any type of divider in any orientation (e.g., horizontal, vertical, diagonal, or the like) suitable for separating the thumbnail panels 402 on thumbnail display 400.

As previously discussed herein, the offboard controller 124 may be configured to include in the thumbnail display 400 after data is extracted a limited subset of a geographical information set contained by chart data (and by each panel 306 thereof) or by an area map 300 (e.g., by choosing what data to extract from an area map 300 during an extraction process). For example, while chart data may include extensive high-altitude navigational information for air traffic in and around international airports (e.g., high-altitude waypoints or other navigational aids), thumbnail display 400 may limit the geographical information conveyed by the corresponding thumbnail panel 402 to the locations of two major airports relative to thumbnail panel 402. The offboard controller 124 may be configured to include in thumbnail display after data is extracted 400 a set of geographical information that is not contained in chart data (e.g., data from area map 300, and city, state, country and/or other geographical data from a user-controlled data set).

It is noted that original insets (not shown) may be associated with chart data and may be expanded complex areas for easier viewing and may have a coordinate system and scaling that is different from chart data. An original inset and an inset 404 determined in relation to the original inset may allow for viewing complex areas in expanded form that is easier for viewing. For example, the original insets may be expanded to provide an expanded view of Los Angeles. The original inset may have discontinuous latitudes and longitudes compared to chart data. The inset 404 may allow for hovering over of inset 404 to provide more information to a user, such as an expanded view for easier viewing. Referring to FIG. 2F, in an optional step 242, a scaled location of an inset 404 on the generated thumbnail display 400 or thumbnail panel 402 may be determined based on an original inset location of an original inset on the received chart data from the chart vendor. For example, the offboard controller 124 may be configured to determine a scaled location of an inset 404 on the generated thumbnail display 400 or on a thumbnail panel 402 based on an original inset location of an original inset on the received chart data from the chart vendor.

In an optional step 244, a scaled size of the inset 404 may be determined based on an original inset size of the original inset on the received chart data. For example, the offboard controller 124 may be configured to determine a scaled size of the inset 404 based on an original inset size of the original inset on the received chart data.

In an optional step 246, the inset area (e.g., the area inside inset 404 of FIG. 4) on the generated thumbnail display 400 or on a thumbnail panel 402 may be filled with an inset fill color. For example, as shown in FIG. 4, the offboard controller 124 may be configured to fill the inset area on the generated thumbnail display 400 or thumbnail panel 402 with an inset fill color.

In an optional step 248, the scaled location may be scaled in relation to the original inset location. For example, the offboard controller 124 may be configured to scale the scaled location in relation to the original inset location. It is noted that the offboard controller 124 may be configured to determine the scaled location, using any manner of scaling, of the inset location such that the inset location is located similarly to how the original inset is located relative to its corresponding panel 306 or chart data. For example, an original inset that is located in a bottom left corner of chart data or panel 306 may be placed in a similar bottom left corner of a thumbnail display 400 or thumbnail panel 402.

In an optional step 250, the scaled size may be scaled in relation to the original inset size. For example, the offboard controller 124 may be configured to scale the scaled size in relation to the original inset size.

For example, the insets 404 may be received by offboard controller 124. For instance, the insets 404 may be included in the chart data received by the offboard controller in step 202. The offboard controller 124 may be configured to superimpose inset 404 or place inset 404 inside a thumbnail panel 402 or thumbnail display 400 (e.g., changing an area of the pixels of thumbnail panel 402 or thumbnail display 400 to graphically represent inset 404). For example, the inset 404 may be superimposed or placed inside a thumbnail panel 402, such that a location of the inset 404 corresponds to an original inset location of the original inset (not shown) located on or associated with chart data. The offboard controller 124 may further be configured to extract data from the original inset (not shown) to inset 404.

In an optional step, the thumbnail display 400 may be provided to an on-board controller configured to cause one or more display devices to display the thumbnail display 400. For example, the offboard controller 124 may be configured to provide the thumbnail display 400 to an on-board controller 102 configured to cause at least one of the one or more display devices 112 to display the thumbnail display 400. The on-board controller 102 may be configured to superimpose the received thumbnail display 400 may on top of a displayed chart 306 of an avionics chart 304 to improve situational awareness. Displaying of a thumbnail display is generally discussed in U.S. patent application Ser. No. 17/525,130, filed on Nov. 12, 2021, which is herein incorporated by reference in the entirety.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for generating a plurality of thumbnail panels, the system comprising:

one or more controllers including one or more processors configured to execute a set of program instructions stored in a memory, the set of program instructions configured to cause the one or more processors to:

receive a chart data from a chart data vendor, the chart data including at least a geographical information set;

receive an area map from an area map chart vendor, wherein the chart data and the area map depict a similar geographical area, wherein the chart data has a first projection type, wherein the area map has a second projection type different than the first projection type;

generate a plurality of panels based on the chart data, each panel of the plurality of panels including one or more panel corners;

project the one or more panel corners for each panel onto the received area map, the one or more panel corners of the plurality of panels defining one or more corners of a plurality of areas to be extracted;

determine an extraction mapping for each area to be extracted of the plurality of areas to be extracted, the extraction mapping configured to map each area to be extracted to a thumbnail panel of the plurality of thumbnail panels based on the one or more corners of the plurality of areas to be extracted;

extract area map data from each area to be extracted to generate the plurality of thumbnail panels using the determined extraction mapping; and generate a thumbnail display by combining each thumbnail panel of the plurality of thumbnail panels.

2. The system of claim 1, the project the one or more panel corners for each panel of the plurality of panels onto the area map comprising:

determining one or more geographical coordinates using an inverse projection algorithm based on the chart data for each of the one or more panel corners, the one or more geographical coordinates based on a coordinate system of the area map.

3. The system of claim 1, the one or more corners for each area to be extracted comprising at least one of:
a first corner, a second corner, a third corner, and a fourth corner.

4. The system of claim 3, each thumbnail panel of the plurality of thumbnail panels including at least a height and a width.

5. The system of claim 4, each area to be extracted comprising:
two or more extraction lines, each of the two or more extraction lines including at least a first end, a second end, and one or more area map coordinates positioned along each of the two or more extraction lines.

6. The system of claim 5, the determine the extraction mapping for each area to be extracted comprising:
determining a first edge between the first corner and the second corner;
determining a second edge between the third corner and the fourth corner;
determining a quantity of the two or more extraction lines based on the height of each thumbnail panel;
determining a quantity of the one or more area map coordinates for each of the two or more extraction lines based on the width of each thumbnail panel;
determining a position of the first end along the first edge for each of the two or more extraction lines;
determining a position of the second end along the second edge for each of the two or more extraction lines;
determining an extraction line width for each of the two or more extraction lines based on the position of the first end and the position of the second end;
determining a location of each of the one or more area map coordinates for each of the two or more extraction lines; and
mapping each pixel of a plurality of pixels of each thumbnail panel to an area map coordinate of one of the one or more area map coordinates.

7. The system of claim 6, the extract the area map data from each area to be extracted comprising:
extracting the area map data from each of the one or more area map coordinates to each pixel of the plurality of pixels.

8. The system of claim 7, at least one of the area map data or the area map including background area map data, the background area map data including at least a first set of background area map data and a second set of background area map data.

9. The system of claim 8, the extracting the area map data from each of the one or more area map coordinates to each pixel comprising:
determining whether each of the one or more area map coordinates falls inside a boundary defining the at least first set of background area map data or the second set of background area map data; and
filling each pixel with one or more fill colors if the each of the one or more area map coordinate falls inside the boundary defining the at least first set of background area map data or the second set of background area map data.

10. The system of claim 9, at least one of the first set of background area map data or the second set of background area map data including at least water background area map data or land background area map data.

11. The system of claim 1, the one or more controllers further configured to:
determine a scaled location of an inset area on the generated thumbnail display based on an original inset location of an original inset on the received chart data from the chart vendor;
determine a scaled size of the inset area based on an original inset size of the original inset on the received chart data; and
fill the inset area on the generated thumbnail display with an inset fill color,
the scaled location being scaled in relation to the original inset location, the scaled size being scaled in relation to the original inset size.

12. A method for generating a plurality of thumbnail panels, the method comprising:
receiving chart data from a chart data vendor, the chart data including at least a geographical information set;
receiving an area map from an area map chart vendor, wherein the chart data and the area map depict a similar geographical area, wherein the chart data has a first projection type, wherein the area map has a second projection type different than the first projection type;
generating a plurality of panels based on the chart data, each panel of the plurality of panels including one or more panel corners;
projecting the one or more panel corners for each panel onto the received area map, the one or more panel corners of the plurality of panels defining one or more corners of a plurality of areas to be extracted;
determining an extraction mapping for each area to be extracted of the plurality of areas to be extracted, the extraction mapping configured to map each area to be extracted to a thumbnail panel of the plurality of thumbnail panels based on the one or more corners of the plurality of areas to be extracted;
extracting area map data from each area to be extracted to generate the plurality of thumbnail panels using the determined extraction mapping; and
generating a thumbnail display by combining each thumbnail panel of the plurality of thumbnail panels.

13. The method of claim 12, the one or more corners for each area to be extracted comprising at least one of:
a first corner, a second corner, a third corner, and a fourth corner.

14. The method of claim 12, the projecting the one or more panel corners for each panel of the plurality of panels onto the area map comprising:
determining one or more geographical coordinates using an inverse projection algorithm based on the chart data for each of the one or more panel corners, the one or more geographical coordinates based on a coordinate system of the area map.

15. The method of claim 12, further comprising:
determining a scaled location of an inset area on the generated thumbnail display based on an original inset location of an original inset on the received chart data from the chart vendor;
determining a scaled size of the inset area based on an original inset size of the original inset on the received chart data; and
filling the inset area on the generated thumbnail display with an inset fill color,
the scaled location being scaled in relation to the original inset location, the scaled size being scaled in relation to the original inset size.

\* \* \* \* \*